United States Patent
Crawley et al.

(10) Patent No.: US 10,436,450 B2
(45) Date of Patent: Oct. 8, 2019

(54) STAGED FUEL AND AIR INJECTORS IN COMBUSTION SYSTEMS OF GAS TURBINES

(71) Applicant: General Electric Company, Schenectady, NY (US)

(72) Inventors: Carolyn Ashley Crawley, Greenville, SC (US); David William Cihlar, Greenville, SC (US); Jun Cai, Greer, SC (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 15/071,090

(22) Filed: Mar. 15, 2016

(65) Prior Publication Data

US 2017/0268784 A1    Sep. 21, 2017

(51) Int. Cl.
| | |
|---|---|
| *F23R 3/34* | (2006.01) |
| *F23R 3/28* | (2006.01) |
| *F23R 3/14* | (2006.01) |
| *F02C 7/22* | (2006.01) |
| *F23R 3/00* | (2006.01) |

(52) U.S. Cl.
CPC .............. *F23R 3/346* (2013.01); *F02C 7/222* (2013.01); *F23R 3/002* (2013.01); *F23R 3/14* (2013.01); *F23R 3/28* (2013.01); *F23R 3/283* (2013.01); *F23R 3/286* (2013.01); *F23R 3/34* (2013.01);
(Continued)

(58) Field of Classification Search
CPC .. F23R 3/34; F23R 3/346; F23R 3/286; F23R 3/002; F23R 3/14; F23R 3/045; F23R 3/28; F23R 3/283
See application file for complete search history.

(56) References Cited

U.S. PATENT DOCUMENTS

| | | | |
|---|---|---|---|
| 6,792,757 B2 * | 9/2004 | Borns | F23R 3/10 60/39.11 |
| 6,898,937 B2 | 5/2005 | Stuttaford et al. | |

(Continued)

FOREIGN PATENT DOCUMENTS

| | | |
|---|---|---|
| CH | 709 993 A2 | 2/2016 |
| WO | 2013/043076 A1 | 3/2013 |

OTHER PUBLICATIONS

European Search Report issued in connection with corresponding EP Application No. 17160267.5 dated Jul. 21, 2017.

*Primary Examiner* — Steven M Sutherland
*Assistant Examiner* — Thuyhang N Nguyen
(74) *Attorney, Agent, or Firm* — Frank A. Landgraff; Charlotte C. Wilson; James W. Pemrick

(57) ABSTRACT

A staged injector in a combustor of a gas turbine. The staged injector may include an injector tube comprising a lateral wall enclosing an injection passageway that extends between an outlet and inlet. An outboard segment of the injector tube may include an exterior face. A cover may be formed about the outboard segment so form a surrounding plenum. The cover may include a side wall that radially overlaps the outboard segment and forms a first portion of the surrounding plenum therebetween. A ceiling wall of the cover may form a second portion of the surrounding plenum. A screening plate may be formed within the side wall of the cover that includes a multitude of apertures configured to fluidly connect the first portion of the surrounding plenum with a feed cavity formed exterior to the side wall.

18 Claims, 18 Drawing Sheets

(52) U.S. Cl.
CPC .................... *F05D 2220/32* (2013.01); *F23R 2900/03044* (2013.01)

(56) References Cited

U.S. PATENT DOCUMENTS

| | | | |
|---|---|---|---|
| 8,656,721 B2 * | 2/2014 | Matsumoto | F23R 3/346 60/733 |
| 2006/0010878 A1 | 1/2006 | Widener | |
| 2006/0196188 A1 * | 9/2006 | Burd | F23R 3/002 60/754 |
| 2009/0173074 A1 | 7/2009 | Johnson et al. | |
| 2012/0024985 A1 | 2/2012 | Johnson et al. | |
| 2013/0174569 A1 * | 7/2013 | Stoia | F23R 3/002 60/776 |
| 2014/0116053 A1 * | 5/2014 | Chen | F23R 3/045 60/737 |
| 2014/0338359 A1 * | 11/2014 | Valeev | F23L 7/00 60/776 |
| 2015/0013342 A1 | 1/2015 | Carey et al. | |
| 2016/0047317 A1 | 2/2016 | Willis et al. | |

\* cited by examiner

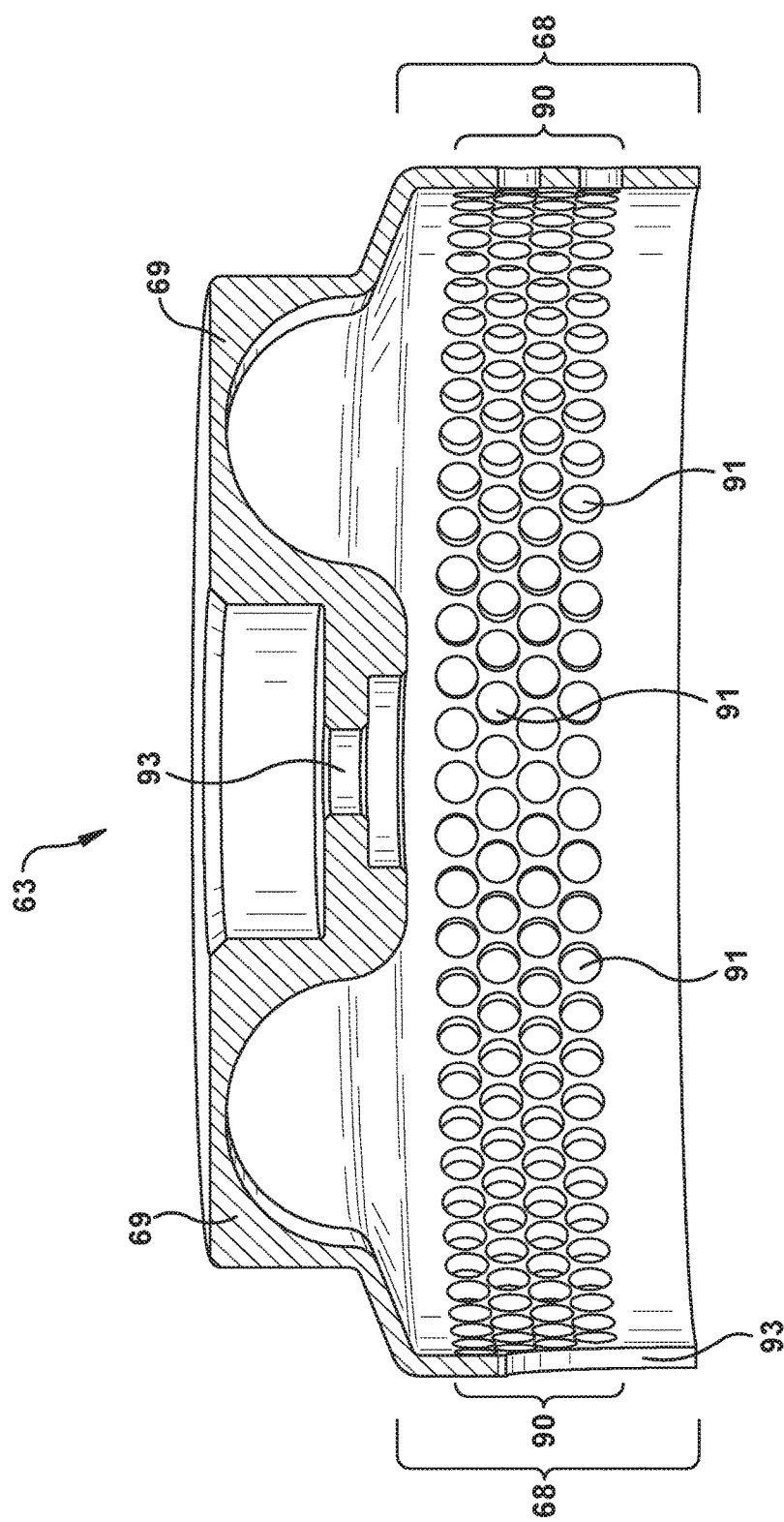

STAGED FUEL AND AIR INJECTORS IN COMBUSTION SYSTEMS OF GAS TURBINES

BACKGROUND OF THE INVENTION

This present application relates generally to combustion systems within combustion or gas turbine engines. More specifically, but not by way of limitation, the present application describes novel systems, apparatus, and/or methods related to downstream or axially staged injectors and/or combustion systems that use such injectors.

As will be appreciated, the efficiency of combustion or gas turbine engines ("gas turbines") has improved significantly over the past several decades as advanced technologies have enabled increases in engine size and higher operating temperatures. The technical advances that have allowed such achievements include new heat transfer technologies for cooling hot gas path components as well as new more durable materials. During this time frame, however, regulatory standards have been enacted that limit the emission levels of certain pollutants. Specifically, the emission levels of NOx, CO and UHC—all of which are sensitive to the operating temperature and combustion characteristics of the engine—have become more strictly regulated. Of these, the emission level of NOx is especially sensitive to increases at higher engine firing temperatures and, thus, this pollutant has become a significant limit as to how much further firing temperatures might be increased. Because higher operating temperatures generally yield more efficient engines, this hindered further advances in efficiency. Thus, performance limitations associated with conventional combustion systems became factor limiting the development of more efficient gas turbines.

One way in which the combustion system exit temperatures have been increased, while still also maintaining acceptable emission levels and cooling requirements, is through the axially staging fuel and air injection. This typically requires increasing air volume passing through the combustor as well as directing more of that volume to staged injectors axially spaced downstream relative to the forward injector positioned at the forward end of the combustor. As will be understood, this increased volume of airflow results in more significance being placed on the aerodynamic performance of the unit. As a result, primary and staged injectors that minimize pressure drop of the compressed air moving through the combustion system may achieve performance benefits and efficiencies that, as flow levels through the combustors increase, become of greater significance.

Another issue related to staged injectors relates to how poorly conventional designs perform in regard to premixing fuel and air before delivery to the combustion zone. More specifically, given the tight spatial constraints and competing design criteria, conventional staged injectors typically do not properly condition the flow of air entering the device, and this leads to uneven flow characteristics that negatively impact the fuel/air mixture that exits the device on the backend. As will be appreciated, such uneven fuel/air mixtures may result in uneven combustion characteristics that generally increase the rate of engine degradation, decrease engine efficiency, and raise undesirable emission levels. As a result, a primary goal of advanced combustion system design remains the development of staged injector configurations that enable higher firing temperatures and more efficient performance, while still minimizing combustion driven emissions and aerodynamic pressure losses. As will be appreciated, such technological advances would result in improved engine efficiency levels.

BRIEF DESCRIPTION OF THE INVENTION

The present application thus describes a staged injector in a combustor of a gas turbine. The combustor may include an inner radial wall that defines a combustion zone downstream of a forward nozzle and, downstream of that, the staged injector. The staged injector may include an injector tube comprising a lateral wall enclosing an injection passageway that extends between an outlet and an inlet. The outlet of the injector tube may fluidly connect the injection passageway to the combustion zone. The inlet of the injector tube may be positioned outboard of the outlet such that the injector tube comprises a steep angle of injection. The lateral wall of an outboard segment of the injector tube may include an exterior face that defines a circumference thereof. The staged injector may further include a cover formed about the outboard segment of the injector tube so to enclose the outboard segment within a surrounding plenum. The cover may include a side wall that radially overlaps and is offset from the lateral wall of the outboard segment of the injector tube so to form a first portion of the surrounding plenum therebetween. The cover may further include a ceiling wall formed outboard of the inlet of the injector tube so to form a second portion of the surrounding plenum. A screening plate may be formed within the side wall of the cover that includes a multitude of apertures configured to fluidly connect the first portion of the surrounding plenum with a feed cavity formed exterior to the side wall.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 18 is a sectional side view of the cover of the staged injector of FIG. 16.

DETAILED DESCRIPTION OF THE INVENTION

Figure 1:
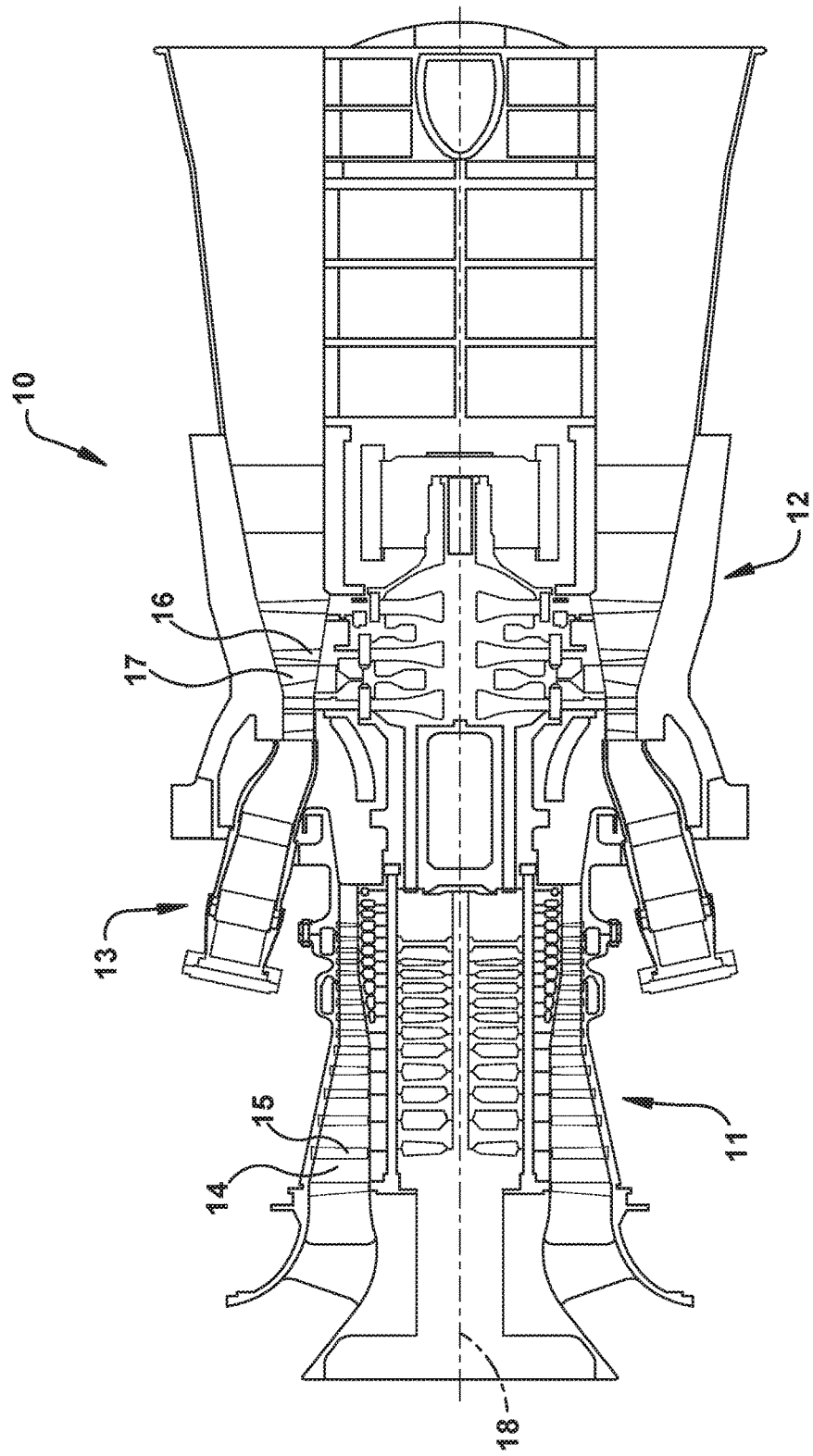
FIG. 1 is a sectional schematic representation of an exemplary gas turbine in which embodiments of the present invention may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves, unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. As such, in understanding the scope of the present invention, attention should not only be paid to the particular terminology used, but also to the accompanying description and context, as well as the configuration, function, and/or usage of the component being referenced and described, including the manner in which the term relates to the several figures, and, of course, the precise usage of the terminology in the appended claims. Further, while the following examples are presented in relation to a certain type of gas turbine or turbine engine, the technology of the present invention also may be applicable to other types of turbine engines as would the understood by a person of ordinary skill in the relevant technological arts.

Several descriptive terms may be used throughout this application so to explain the functioning of turbine engines and/or the several sub-systems or components included therewithin, and it may prove beneficial to define these terms at the onset of this section. Accordingly, these terms and their definitions, unless stated otherwise, are as follows. The terms "forward" and "aftward", without further specificity, refer to direction relative to the orientation of the gas turbine. Accordingly, "forward" refers to the compressor end of the engine, while "aftward" refers to the turbine end of the engine. Within the combustor, the terms "forward" and "aftward" refer to direction relative to the orientation of the combustor, with the term "forward" referring to the head end of the combustor, while "aftward" refers to the end connecting to the turbine. Each of these terms, thus, may be used to indicate movement or relative position along the longitudinal central axis of the machine or combustor or other component as will be contextually apparent. The terms "downstream" and "upstream" are used to indicate position within a specified conduit relative to the general direction of flow moving through it. As will be appreciated, these terms reference a direction relative to the direction of flow expected through the specified conduit during normal operation, which should be plainly apparent to those skilled in the art. As such, the term "downstream" refers to the direction in which the fluid is flowing through the specified conduit, while "upstream" refers to the opposite of that. Thus, for example, the primary flow of working fluid through a gas turbine, which begins as air moving through the compressor and then becomes combustion gases within the combustor and beyond, may be described as beginning at an upstream location toward an upstream or forward end of the compressor and terminating at an downstream location toward a downstream or aftward end of the turbine.

In regard to describing the direction of flow within a common type of combustor, as discussed in more detail below, it will be appreciated that compressor discharge air typically enters the combustor through impingement ports that are concentrated toward the aftward end of the combustor (relative to the longitudinal central axis of the combustor and the aforementioned compressor/turbine positioning that defines forward/aft distinctions). Once in the combustor, the compressed air is guided by a flow annulus formed about an interior chamber toward the forward end of the combustor, where the airflow enters the interior chamber and, reversing its direction of flow, travels toward the aftward end of the combustor. In yet another context, the flow of coolant through cooling channels or passages may be treated in the same manner.

Additionally, given the configuration of compressor and turbine about a central common axis, as well as the cylindrical configuration about a central axis that is typical to many combustor types, terms describing position relative to such axes may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis, and the term "circumferential" refers to movement or position around an axis. As mentioned, while these terms may be applied in relation to the common central axis that extends through the compressor and turbine sections of the engine, these terms also may be used in relation to other components or sub-systems of the engine as may be appropriate.

By way of background, referring now to the figures, FIG. 1 illustrates an exemplary gas turbine 10 in which embodiments of the present application may be used. It will be understood by those skilled in the art that the present invention may not be limited for use in this particular type of turbine engine, and, unless otherwise stated, the examples provided are not meant to be so limiting. In general, gas turbines operate by extracting energy from a pressurized flow of hot gases produced by the combustion of a fuel in a stream of compressed air. As shown, the gas turbine 10 may include an axial compressor 11 that is mechanically coupled via a common shaft or rotor to a downstream turbine section or turbine 12, with a combustor 13 positioned therebetween. As shown, the common shaft of the gas turbine 10 forms a central axis 18 that extends through the compressor 11 and turbine 12.

The compressor 11 may include a plurality of stages, each of which may include a row of compressor rotor blades 14 followed by a row of compressor stator blades 15. Thus, a first stage may include a row of compressor rotor blades 14, which rotates about the central axis 18', followed by a row of compressor stator blades 15, which remains stationary during operation. The turbine 12 also may include a plurality of stages. In the case of the illustrated exemplary turbine 12, a first stage may include a row of nozzles or turbine stator blades 17, which remains stationary during operation, followed by a row of turbine buckets or rotor blades 16, which rotates about the central axis 18 during operation. As will be appreciated, the turbine stator blades 17 within one of the rows generally are circumferentially spaced one from the other and fixed about the axis of rotation. The turbine rotor blades 16 may be mounted on a rotor wheel or disc for rotation about the central axis 18. It will be appreciated that the turbine stator blades 17 and turbine rotor blades 16 lie in the hot gas path of the turbine 12 and interact with the hot gases moving therethrough.

In one example of operation, the rotation of the rotor blades 14 within the axial compressor 11 compresses a flow of air. In the combustor 13, energy is released when the compressed airflow is mixed with a fuel and ignited. The resulting flow of hot combustion gases from the combustor 13, which may be referred to as the working fluid, is then directed over the turbine rotor blades 16, with the flow thereof inducing the rotor blades 16 to rotate about the shaft. In this manner, the energy of the flow of working fluid is transformed into the mechanical energy of the rotating blades and, given the connection between the rotor blades and the shaft via the rotor disc, the rotating shaft. The mechanical energy of the shaft then may be used to drive the rotation of the compressor rotor blades, such that the necessary supply of compressed air is produced, and also, for example, a generator for the production of electricity, as would be the case in a power generating application.

Figure 2:
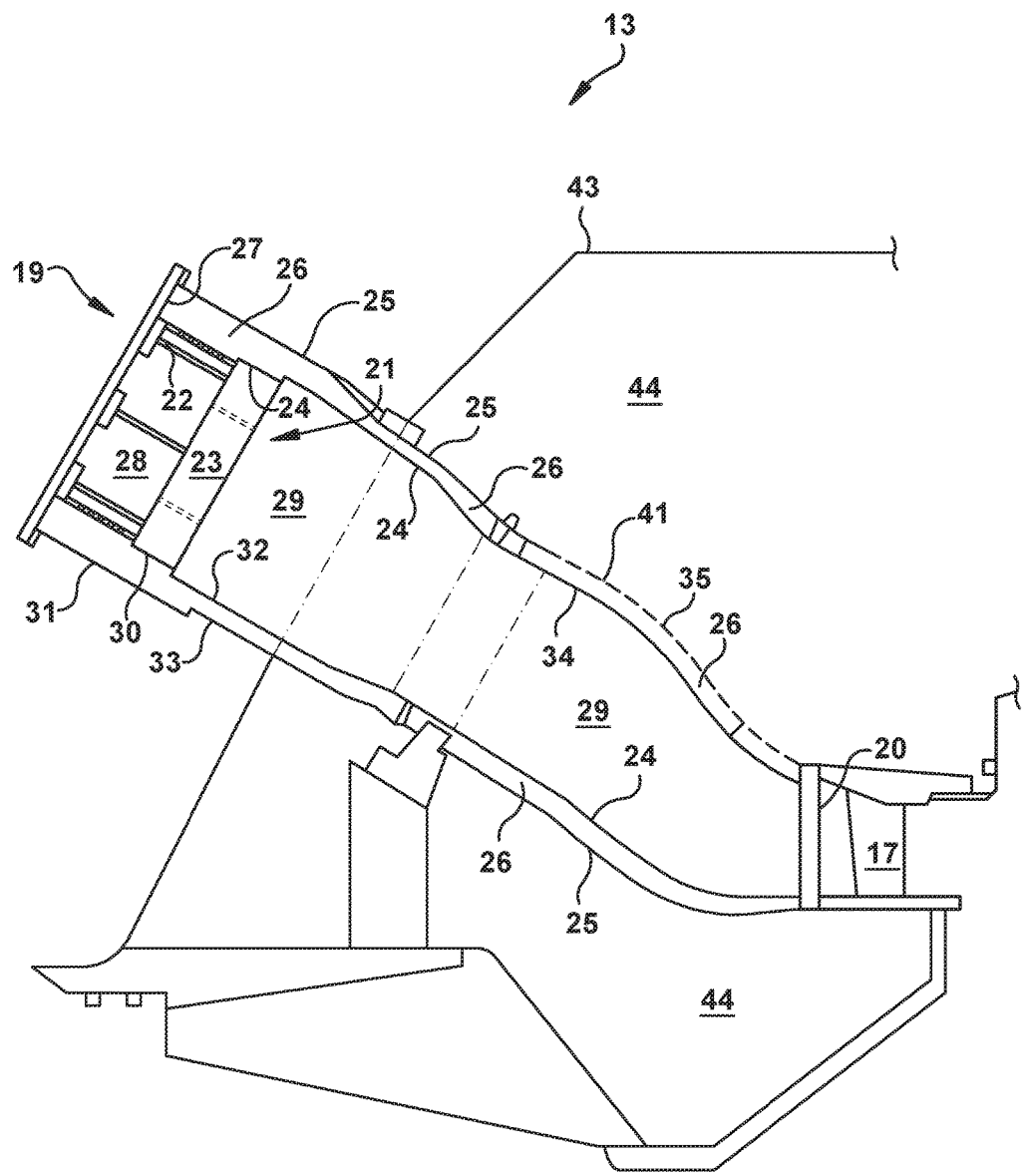
FIG. 2 is a sectional schematic illustration of a conventional combustor and surrounding systems in which embodiments of the present invention may be used.

FIG. 2 provides a simplified cross-sectional view of a conventional combustor 13 and surrounding structure. As will be appreciated, the combustor 13 may be axially defined between a headend 19, which is positioned at the forward end of the combustor 13, and an aft frame 20, which is positioned at the aftward end of the combustor 13 and functions to connect the combustor 13 to the turbine 12. A primary or forward injector 21 may be positioned toward the forward end of the combustor 13. As used herein, the forward injector 21 refers to the forward-most fuel and air injector in the combustor 13, which typically serves as the main component for mixing fuel and air for combustion. The forward injector 21 may connect to a fuel line 22 and include a nozzle 23. The nozzle 23 of the forward injector 21 may include any type of conventional nozzle, such as, for example, a micro-mixer nozzle, a nozzle having a swirling or swozzle configuration, or other type of nozzle that meets the functionality discussed herein. As illustrated, the headend 19 may provide various manifolds, apparatus, and fuel lines 22, through which fuel may be delivered to the forward injector 21. The headend 19, as illustrated, also may include an endcover 27 that, as will be appreciated, forms the forward axial boundary of the large interior cavity that is defined within the combustor 13.

As illustrated, the main interior cavity defined within the combustor 13 is subdivided into several lesser spaces or chambers. These chambers may include flow directing structure (such as walls, ports, and the like) that is configured to direct a flow of compressed air, the fuel/air mixture, and combustion products along a desired flow route. As will be discussed in more detail below, the interior cavity of the combustor 13 may include an inner radial wall 24 and, formed about the inner radial wall 24, an outer radial wall 25. As illustrated, the inner radial wall 24 and outer radial wall 25 may be configured such that a flow annulus 26 is defined therebetween. As further illustrated, at the forward end of the region defined within the inner radial wall 24, a forward chamber 28 and, an aftward of the forward chamber 28, an aftward chamber 29 are defined. As will be appreciated, the forward chamber 28 is a section of the inner radial wall 24 that is typically referred to as a cap assembly 30. As will be appreciated, the aftward chamber 29 defines the region within which the fuel and air mixture brought together within the forward injector 21 is ignited and combusted, and, thus, may be referred to as the combustion zone 29. It will be appreciated that, given this arrangement, the forward and aftward chambers 28, 29 may be described as being axially stacked in their configuration. Unless otherwise specifically limited, the combustor 13 of the present invention may be arranged as an annular combustor or a can-annular combustor.

The cap assembly 30, as shown, may extend aftward from a connection it makes with the endcover 27, and be surrounded generally by an axial section of the outer radial wall 25 that may be referred herein as the combustor casing 31. As will be appreciated, the combustor casing 31 may be formed just outboard of and in spaced relation to the outer surface of the cap assembly 30. In this manner, the cap assembly 30 and the combustor casing 31 may form an axial section of the flow annulus 26 between them. As will be appreciated, the cap assembly 30 may further house and structurally support the nozzle 23 of the forward injector 21, which may be positioned at or near the aftward end of the cap assembly 30.

The aftward chamber or combustion zone 29 that occurs just downstream of the forward injector 21 may be circumferentially defined by an axial section of the inner radial wall 24 that, depending on the type of combustor, may be referred to as a liner 32. From the liner 32, the aftward chamber 29 may extend aftward through a downstream section of the inner radial wall 24, which is often referred to as a transition piece 34. As will be appreciated, this aftward axial section of the inner radial wall 24 directs the flow of hot combustion gases toward the connection that the combustor 13 makes with the turbine 12. Though other configurations are possible, within the transition piece 34 the cross-sectional area of the aftward chamber 29 (i.e., the combustion zone 29) smoothly transition from the typically circular shape of the liner 32 to a more annular shape of the transition piece 34 exit, which is necessary for directing the flow of hot gases onto the turbine blades in a desirable manner. As will be appreciated, the liner 32 and the transition piece 34 may be constructed as separately formed components that are joined via some conventional manner, such as mechanical attachment. According to other designs, however, the liner 32 and the transition piece 34 may be formed as an integral component or unibody. Accordingly, unless otherwise stated, reference to the inner radial wall 24 should be understood to encompass either alternative.

The outer radial wall 25, as mentioned, may surround the inner radial wall 24 so that the flow annulus 26 is formed between them. According to exemplary configurations, positioned about the liner 32 section of the inner radial wall 24 is a section of the outer radial wall 25 that may be referred to as a liner sleeve 33. Though other configurations are also possible, the liner 32 and liner sleeve 33 may be cylindrical in shape and concentrically arranged. As illustrated, the section of the flow annulus 26 formed between the cap assembly 30 and the combustor casing 31 may connect to the section of the flow annulus 26 defined between the liner 32 and liner sleeve 33 and, in this way, the flow annulus 26 extends aftward (i.e., toward the turbine 12). In similar fashion, as illustrated, positioned about the transition piece 34 section of the inner radial wall 24 is a section of the outer radial wall 25 that may be referred to as a transition sleeve 35. As shown, the transition sleeve 35 is configured to surround the transition piece 34 such that the flow annulus 26 is extended further aftward.

According to the example provided, it will be appreciated that the flow annulus 26 extends axially between a forward end defined at the endcover 27 of the headend 19 to an aftward end near the aft frame 20. More specifically, it will be appreciated that the inner radial wall 24 and the outer radial wall 25 (as may be defined by each of the cap assembly 30/combustor casing 31, the liner 32/liner sleeve 33, and the transition piece 34/transition sleeve 35 pairings) may be configured such that the flow annulus 26 extends over much of the axial length of the combustor 13. As will be appreciated, like the liner 32 and transition piece 34, the liner sleeve 33 and the transition sleeve 35 may include separately formed components that are connected via some conventional manner, such as mechanical attachment. According to other designs, however, the liner sleeve 33 and the transition sleeve 35 may be formed together as an integral component or unibody. Accordingly, unless otherwise stated, reference to the outer radial wall 25 should be understood to encompass either alternative.

The liner sleeve 33 and/or the transition sleeve 35 may include a plurality of impingement ports 41 that allow compressed air external to the combustor 13 to enter the flow annulus 26. It will be appreciated that, as shown in FIG. 2, a compressor discharge casing 43 defines a compressor discharge cavity 44 about the combustor 13. According to conventional design, the compressor discharge cavity 44 may be configured to receive a supply of compressed air from the compressor 11 such that the compressed air enters the flow annulus 26 through the impingement ports 41. As will be appreciated, the impingement ports 41 may be configured to impinge the airflow entering the combustor 13 so that fast moving jets of air are produced. These jets are trained against the outer surface of the inner radial wall 24—which, as just described, may include the liner 32 and transition piece 34, or an integral unibody—so to convectively cool the inner radial wall 24 during operation. According to conventional design, once in the flow annulus 26, the compressed air is typically directed toward the forward end of the combustor 13, where, via one or more cap inlets 45 formed in the cap assembly 30, the airflow enters the forward region of the cap assembly 30. Once within the cap assembly 30, the compressed air may then be directed to the nozzle 23 of the forward injector 21 where, as mentioned, it is mixed with fuel for combustion within the combustion zone 29.

Figure 3:
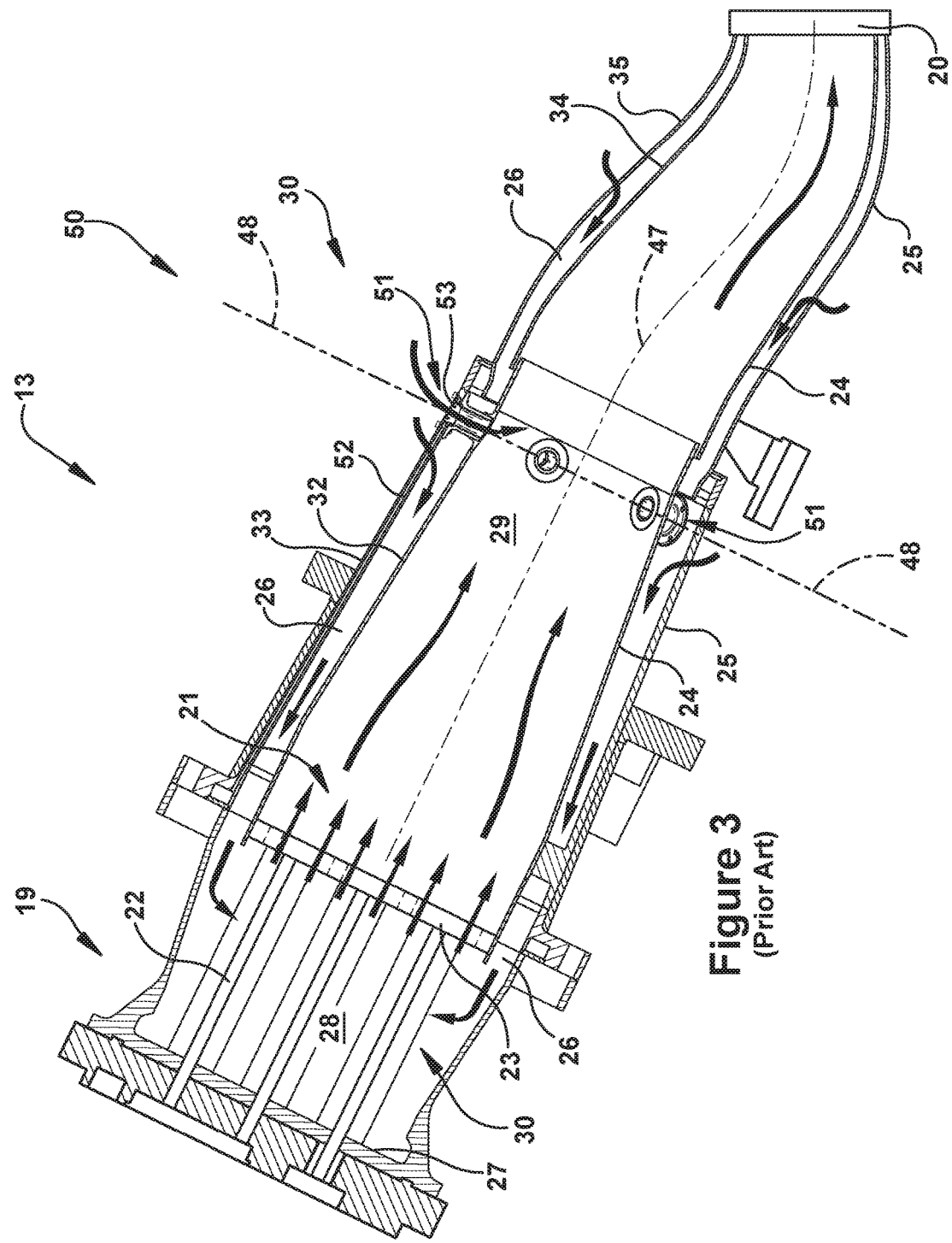
FIG. 3 is a sectional schematic representation of a conventional combustor having an exemplary staged injection system in which embodiments of the present invention may be used.

FIG. 3 illustrates a view of a combustor 13 having a staged injection system 50 that enables aftward, downstream, or axially staged injection of fuel and/or air into the combustion zone 29. It will be appreciated that such fuel and air injection systems are commonly referred to as supplemental injection systems, late-lean injection systems, axially staged injection systems, reheat systems and the like. As used herein, aspects of these types of fuel and air injectors, injection systems, and/or the components associated therewith will be referred to generally, without limitation except as that provided herein, as "staged injection systems", and the injectors used within such systems as "staged injectors." It further will be appreciated that the staged injection system 50 of FIG. 3 is consistent with an exemplary conventional design and is provided merely for those purposes.

As will be understood, staged injection systems have been developed for gas turbine combustors for a number of reasons, including to reduce emissions. While emission levels for gas turbines depend upon many criteria, a significant factor relates to the temperature of reactants within the combustion zone, which has been shown to affect certain emission levels, such as NOx, more than others. It will be appreciated that the temperature of the reactants in the combustion zone is proportionally related to the exit temperature of the combustor, which corresponds to higher pressure ratios and improved efficiency levels in Brayton Cycle type engines. Because it has been found that the emission levels of NOx has a strong and direct relationship to reactant temperatures, modern gas turbines have been able to maintain acceptable NOx emission levels while increasing firing temperatures only through technological advancements, such as advanced fuel nozzle design and premixing. Subsequent to those advancements, axially staged injection has been employed to enable further increases in firing temperature, as it was found that shorter residence times of the reactants at the higher temperatures within the combustion zone decreased NOx levels.

In operation, as will be appreciated, such staged injection systems typically introduce a portion of the combustor total air and fuel supply downstream of what is typically the primary injection point at the forward end of the combustor.

It will be appreciated that such downstream positioning of the injectors decreases the time the combustion reactants remain at the higher temperatures of the flame zone. That is to say, shortening the distance reactants travel before exiting the flame zone reduces the time those reactants reside within the highest temperatures of the combustor, which, in turn, reduces NOx formation and lowers overall NOx emission levels. This has allowed advanced combustor designs that couple fuel/air mixing or pre-mixing technologies with the reduced reactant residence times of downstream injection to achieve further increases in combustor firing temperature and, importantly, more efficient engines, while also maintaining acceptable NOx emission levels. As will be appreciated, there are other considerations limiting the manner and extent to which downstream injection may be done. For example, downstream injection may cause emission levels of CO and UHC to rise. That is, if fuel is injected in too large of quantities at locations that are too far downstream in the combustion zone, it may result in the incomplete combustion of the fuel or insufficient burnout of CO. Accordingly, while the basic principles around the notion of late injection and how it may be used to affect certain emissions may be known generally, design obstacles remain as how this strategy may be best employed so to enable more efficient and cleaner running engines.

In one exemplary configuration, as shown in FIG. 3, the staged injection system 50 includes a forward injector 21 as well as one or more staged injectors 51. As used herein, staged injectors 51 are injectors axially spaced aftward from the forward injector 21. According to the exemplary arrangement, each of the staged injectors 51 includes a fuel passageway 52 that connects to an injector tube 53. Within the injector tube 53, a fuel/air mixture is created for injection into the downstream portions of the combustion zone. As illustrated, the fuel passageway 52 may be contained within the outer radial wall 25 of the combustor 13, though other apparatus and methods for fuel delivery are also possible. The fuel passageway 52 may extend between a connection to a fuel source occurring near the headend 19 and the connection it makes with the staged injectors 51. Though other configurations are also possible, multiple ones of the staged injectors 51 may be positioned about the periphery of the combustion zone 29. The axial positioning of the staged injectors 51, as shown, may be the aftward end of the liner 32/liner sleeve 33 assembly. Other axial positions are also possible. The injector tube 53 may be configured to intersect and extend across the flow annulus 26, and to deliver the flow within it for injection into the combustion zone 29.

As further shown in the example of FIG. 3, the staged injection system 50 may include several of the staged injectors 51 spaced circumferentially about the aftward chamber 29 of the combustor 13. Such staged injectors 51 may be integrated into the liner 32/liner sleeve 32 assembly or the transition piece 34/transition sleeve 35 assembly (or, more generally, the inner radial wall 24/outer radial wall 25 assembly). The staged injectors 51 may be arrayed so that a fuel/air mixture is injected at multiple circumferentially spaced points about the combustion zone 29. As illustrated, the staged injectors 51 may be positioned about a common axial position. That is to say, a plurality of the staged injectors 51 may be located about the approximate same axial position along a longitudinal central axis 47 of the combustor 13. Having this configuration, the staged injectors 51 may be described as being positioned on a common plane, or, as it will be referred to herein, an injection reference plane 48 as indicated in FIG. 3.

Figure 4:
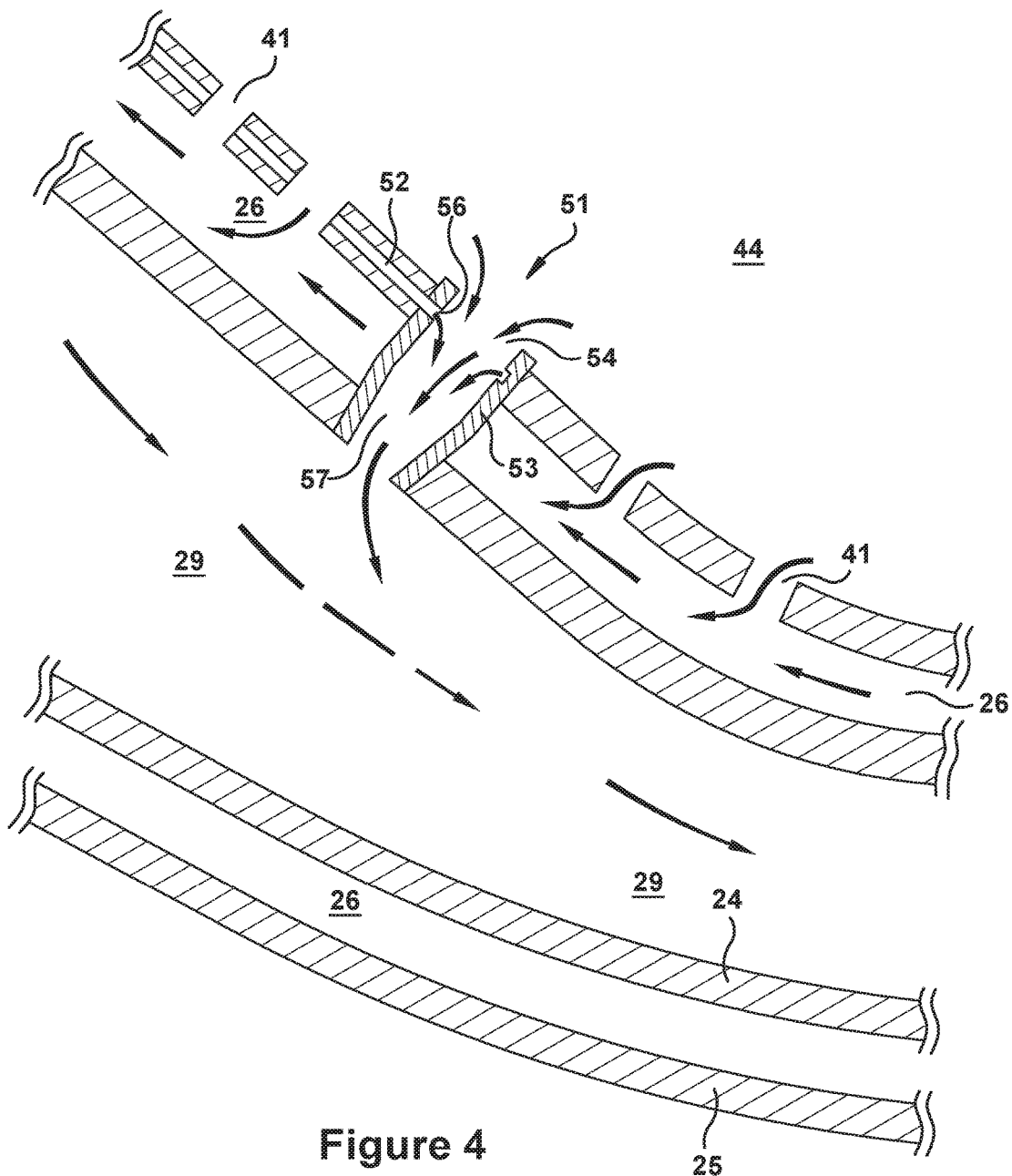
FIG. 4 is a sectional view of a convention staged injector.
Figure 5:
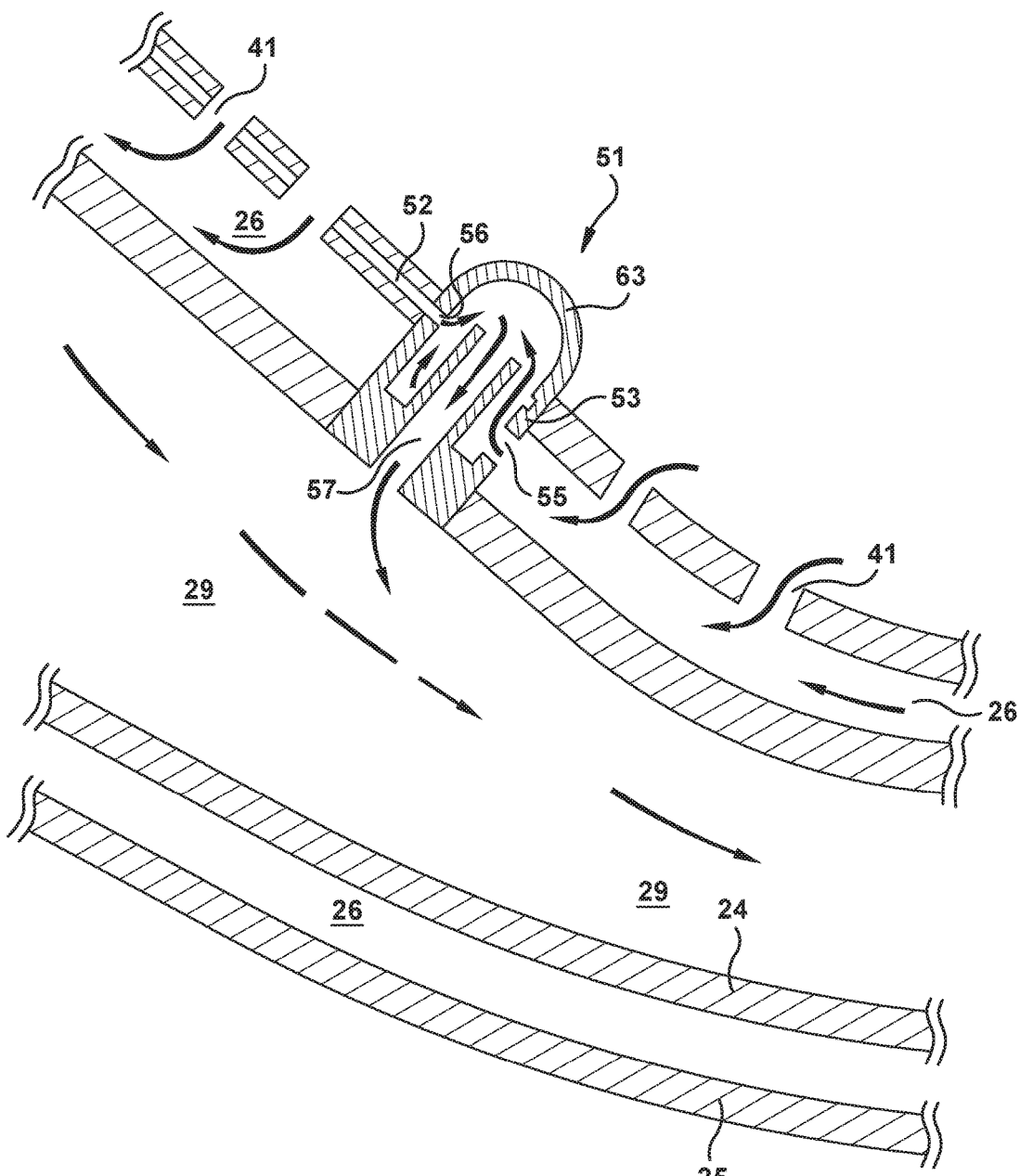
FIG. 5 is a sectional view of another conventional staged injector.

FIGS. 4 and 5 illustrate exemplary configurations of conventional staged injectors 51. As shown, each of the exemplary staged injectors 51 may include an injector tube 53 that extends across the flow annulus 26. The injector tube 53 may be configured as a cylindrical tube that defines an injection passageway 57. The injection passageway 57 may be configured to carry the fuel/air brought together within the staged injector 51 across the flow annulus 26 for ultimate injection into the combustion zone 29.

With particular reference now to FIG. 4, according to one arrangement, the injector tube 53 ingests an air supply via an outboard port 54, which fluidly connects the injector tube 53 to the compressor discharge cavity 44 that surrounds the outer radial wall 25 of the combustor 13. Though other configurations are also possible, the injector tube 53 may further include fuel ports 56 for injecting fuel (delivered to it via the fuel passageway 52) into the supply of ingested air. According to an alternative arrangement, as illustrated in FIG. 5, the staged injector 51 may include a cover 63 positioned about an outboard end of the injector tube 53. The cover 63, as shown, may be used to control, limit, or prevent entry of air into the injector tube 53 directly from the compressor discharge cavity 44. As will be appreciated, the cover 63 also may be configured to create an additional volume of enclosed space within which the fuel and air may be more thoroughly mixed before injection. It will be appreciated that such covers 63 may serve to substantially isolate the staged injector 51 from direct fluid communication with the compressor discharge cavity 44. Instead the staged injector 51 may include lateral ports 55 formed through the injector tube 53 through which a supply of air from the flow annulus 26 is ingested.

With general reference now to FIGS. 6 through 18, staged injectors and related components in accordance with the present invention are described. As will be appreciated, the staged injectors of the present invention may be used as part of downstream, late-lean, or staged injection systems, which, as already described, may be configured to inject a mixture of fuel and air within a downstream or aft end of the combustion zone. As an initial matter, it will be appreciated that staged injectors and the various related components may be described according to the previously described orientation characteristics of the combustor/gas turbine within which they operate. Thus, for purposes herein, relative radial, axial, and circumferential positioning for the staged injectors and related components may be described relative to the central longitudinal axis 47 of the combustor 13 (which, as described above, extends through the combustion zone 29 defined by the inner radial wall 24). Additionally, as used herein, forward and aftward directions are defined relative to the forward end of the combustor (as defined by the location of the head end 19) and the aftward end of the combustor 13 (as defined by the connection made with the turbine 12). Finally, a flow direction (and upstream and downstream designations related thereto) is defined relative to an expected direction of flow of a fluid within a specified conduit during normal operation of the engine.

Figure 6:
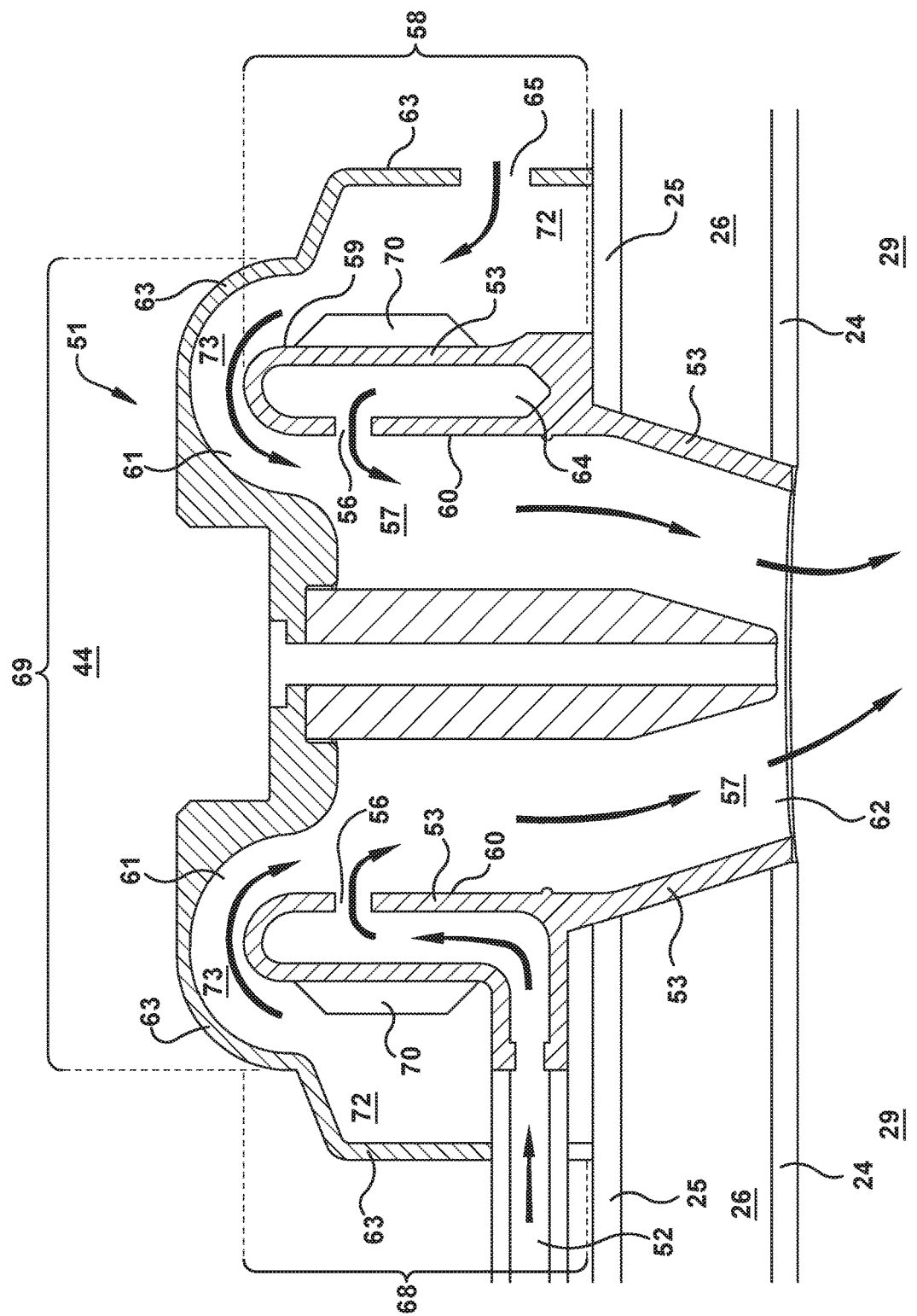
FIG. 6 is a sectional side view of a staged injector according to an embodiment of the present invention.

With specific reference now to FIG. 6, according to one example, the staged injector 51 of the present application includes an injector tube 53 that defines an injection passageway 57. The injector tube 53 may include rigid lateral walls that extend between an inlet 61 formed at one end and an outlet 62 formed at the other, and, therebetween, the lateral walls may enclose the injection passageway 57. As illustrated, the outlet 62 of the injector tube 53 fluidly connects the injection passageway 57 to the combustion zone 29, whereas the inlet 61 is disposed outboard of the outlet 62 and positioned such that the injector tube 53 maintains a steep injection angle relative to the combustion zone 29. (As used herein, the injection angle is the angle formed between the longitudinal axis of the injection passageway 57 and that of the combustion zone 29.) As illustrated, the injection angle may be approximately 90°. According to other embodiments, the injection angle may be between 70° and 110°. The injector tube 53 may include an outboard segment 58, which, as used herein, is a longitudinally defined segment of the injector tube 53 at the outboard end of the injector tube 53. As indicated, to one side the outboard segment 58 may border the inlet 61 of the injector tube 53. The outboard segment 58 includes an exterior face 59, which, as will be appreciated, defines the circumference of the outboard segment 58. The outboard segment 58 may further include an interior face 60 that defines a portion of the injection passageway 57.

As illustrated, according the present embodiments, the staged injector 51 further includes a cover 63, which is formed about the outboard segment 58 of the injector tube 53. The cover 63 may be configured to substantially enclose the outboard segment 58 within a surrounding plenum 66. For descriptive purposes herein, the cover 63 may be described as including a side wall 68 that transitions into a ceiling wall 69. As indicated, the side wall 68 is the portion of the cover 63 that radially overlaps and surrounds the outboard segment 58 of the injector tube 53. A first portion 72 of the surrounding plenum 66 may be described as being formed between the side wall 68 of the cover 63 and the exterior face 59 of the outboard segment 58. As also shown, the ceiling wall 69 is the outer radial portion of the cover 63 that is formed outboard of the inlet 61 of the injector tube 53. The ceiling wall 69 may span between the outboard boundary or edge of the side wall 68 so to form a second portion 73 of the surrounding plenum 66 outboard of the inlet 61 of the injector tube 53. Specifically, the second portion 73 of the surrounding plenum 66 may be described as being formed between the inlet 61 and the ceiling wall 69. As will be appreciated, the first portion 72 and the second portion 73 of the surrounding plenum 66 are not physically separated, but are being defined as separate spaces for descriptive purposes herein. According to certain preferred embodiments, the outboard segment 58 of the injector tube 53 may have a cylindrical shape, and the side wall 68 of the cover 63 also may have a cylindrical shape. The outboard segment 58 of the injector tube 53 and the side wall 68 of the cover 63 may be concentrically arranged.

The staged injector 51 may further include a directional port formed through the cover 63, which will be referred to herein as a directional cover port 65. According to exemplary embodiments, the directional cover port 65 is formed through one of the sides of the side wall 68 of the cover 63 such that the airflow entering the surrounding plenum is an asymmetrical or directionally biased. In such cases, the directional cover port 65 fluidly connects the first portion 72 of the surrounding plenum 66 to a feed cavity that is formed exterior to the cover 63. As described more below, the feed cavity may be the compressor discharge cavity 44 or the flow annulus, depending on the configuration of the staged injector 51 relative to the inner and outer radial walls 24, 25.

The staged injector 51 may further include flow directing lateral vanes 70 disposed on the exterior face 59 of the outboard segment 58 of the injector tube 53. The lateral vanes 70 may be configured to radially deflect airflow entering the first portion 72 of the surrounding plenum 66 through the directional cover port 65. As will be appreciated, the radially deflection may redirect the airflow toward the second portion 73 of the surrounding plenum 66 where it may gain access to the inlet 61 of the injector tube 53. The lateral vanes 70 may be configured to condition the airflow moving through the staged injector 51 for more effective and even mixing with a fuel supply. This feature may determine the directionality and velocity of the inlet flow to the injector tube 58. As will be appreciated, directly downstream of the inlet is where the flow mixes with fuel. As achieving a uniform homogenous fuel/air mix is critical, the lateral vanes 70, as provide herein, may serve the vital function of conditioning the airflow so to promote this result.

As further shown between the exterior face 59 and interior face 60, the outboard segment 58 of the injector tube 53 may include a fuel plenum 64. Preferably, the fuel plenum 64 includes a continuous passageway that encircles the injection passageway 57. In this way, the fuel plenum 64 may deliver fuel to several fuel ports 56 that are circumferentially spaced about the injection passageway 57. The fuel ports 56 may be formed through the interior face 60 of the injector tube 53. According to an alternative embodiment, the fuel ports 56 are formed through the exterior face 59 of the injector tube 53.

Figure 7:
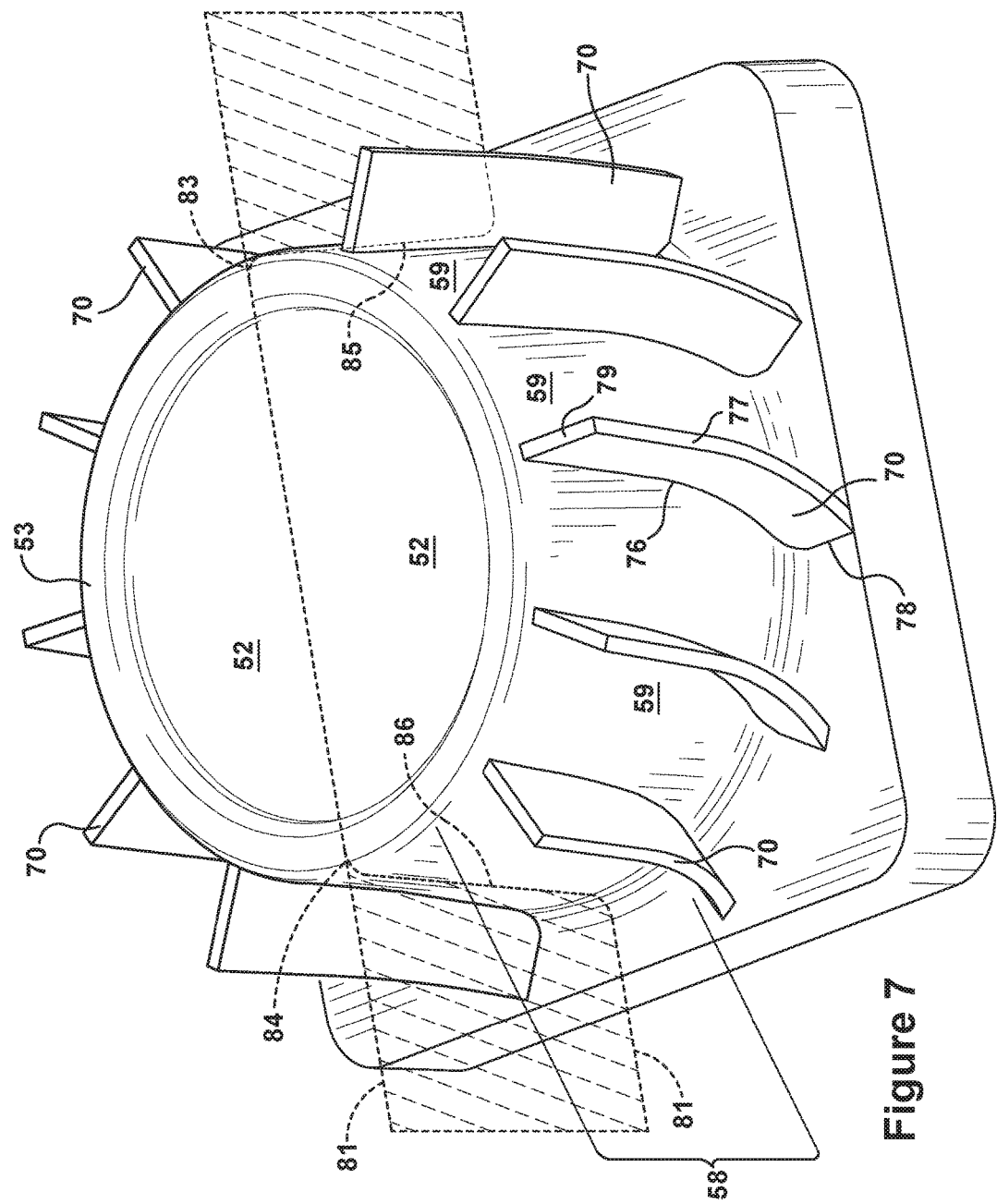
FIG. 7 is a perspective view of an injector tube having lateral vanes according to an embodiment of the present invention.

Referring now to FIG. 7, a perspective view of the outboard segment 58 of the injector tube 53 is provided to illustrate an exemplary configuration of the lateral vanes 70 that may be affixed thereto. As depicted, the lateral vanes 70 may be configured as approximately radially oriented fins. Each may protrude from the exterior face 59 of the outboard segment 58 and form a steep angle relative thereto. According to the exemplary embodiment, the lateral vanes 70 may extend approximately perpendicular relative to the exterior face 59 immediately surrounding it. For descriptive purposes herein, each of the lateral vanes 70 may be described via the edges that define its perimeter, which, as illustrated, may include: opposing near and far edges 76, 77; and opposing inboard and outboard edges 78, 79. As indicated, the near edge 76 is designated as the edge along which the lateral vane 70 attaches to the exterior face 59 of the outboard segment 58, while the far edge 77 is the edge opposite that and offset from the exterior face 59. The inboard edge 78 is the inboard-most edge of the lateral vane 70, while the outboard edge 79 is the outboard-most edge of the lateral vane 70. Further, the lateral vanes 70 include dimension characteristics that are designated as follows: a height of the lateral vane 70 measures a radial distance between the inboard edge 78 and the outboard edge 79; and a width of the lateral vane 70 measures a distance between the near edge 76 and the far edge 77.

For description purposes, as also illustrated in FIG. 7, a reference bisecting plane 81 may be drawn that bisects or divides the outboard segment 58 of the injector tube 53 into approximate halves. As will be appreciated, in doing this, the exterior face 59 of the outboard segment 58 is then divided into opposing first and section exterior faces, 59a, 59b. The reference bisecting plane 81 may include: an upstream end 83 at the point where the reference bisecting plane 81 first intersects the exterior face 59 of the outboard segment 58; and a downstream end 84 at the point where the continuation of the reference bisecting plane 81 next intersects the exterior face 59 of the outboard segment 58. In such cases, as will be appreciated, each of the first exterior face 59a and second exterior face 59b may be described as including: upstream edges 85 (which are defined at the upstream end 83 of the reference bisecting plane 81); and downstream edges 86 (which are defined at the downstream end 84 of the reference bisecting plane 81). As will be discussed more below, the reference bisecting plane 81 may be oriented according to a directionality by which airflow enters and flows through the surrounding plenum 66. More specifically, the reference bisecting plane 81 may be oriented such that a continuation of the reference bisecting plane 81 from the upstream end 83 aims toward or bisects the directional cover port 65.

As further shown, according to preferred embodiments, both the first and second exterior faces 59a, 59b include a plurality of the lateral vanes 70. On each of the exterior faces 59a, 59b, the plurality of lateral vanes 70 may be circumferentially spaced between the upstream edge 85 and downstream edge 86. As also indicated, the lateral vanes 70 themselves may be described as including opposing faces, which are designated as an upstream face 87 and a downstream face 88 according to a relative nearness to the upstream edge 85 and downstream edge 86 of the exterior face 59. Finally, as used herein, the surface area of the upstream face 87 of the lateral vanes 70 is a characteristic describing a total surface area of the upstream face 87, which is a characteristic that will be referred to in the discussion below.

Figure 8:
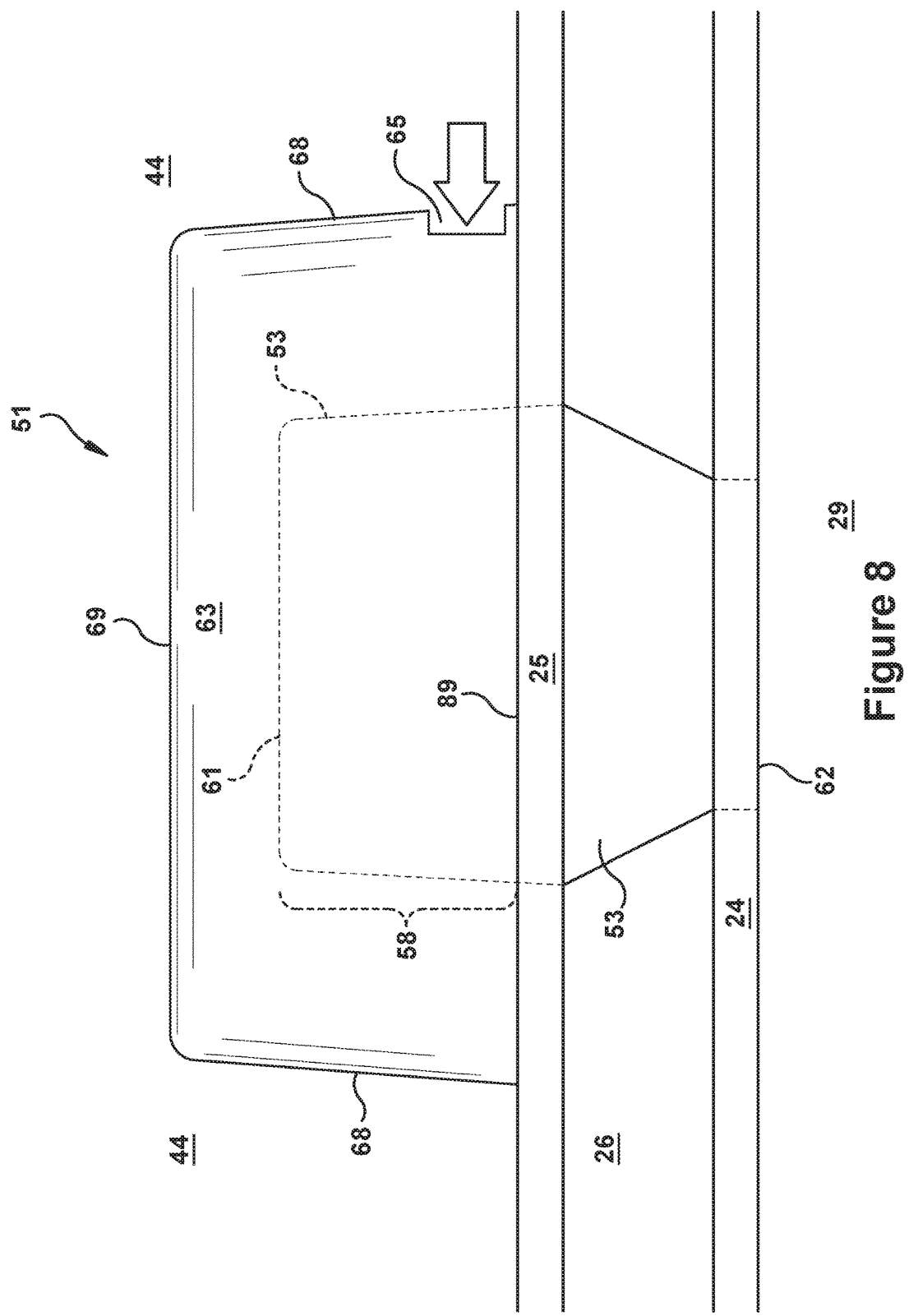
FIG. 8 is a sectional side view of a possible installed configuration of a staged injector relative to inner and outer radial walls of the combustor in accordance with the present invention.
Figure 9:
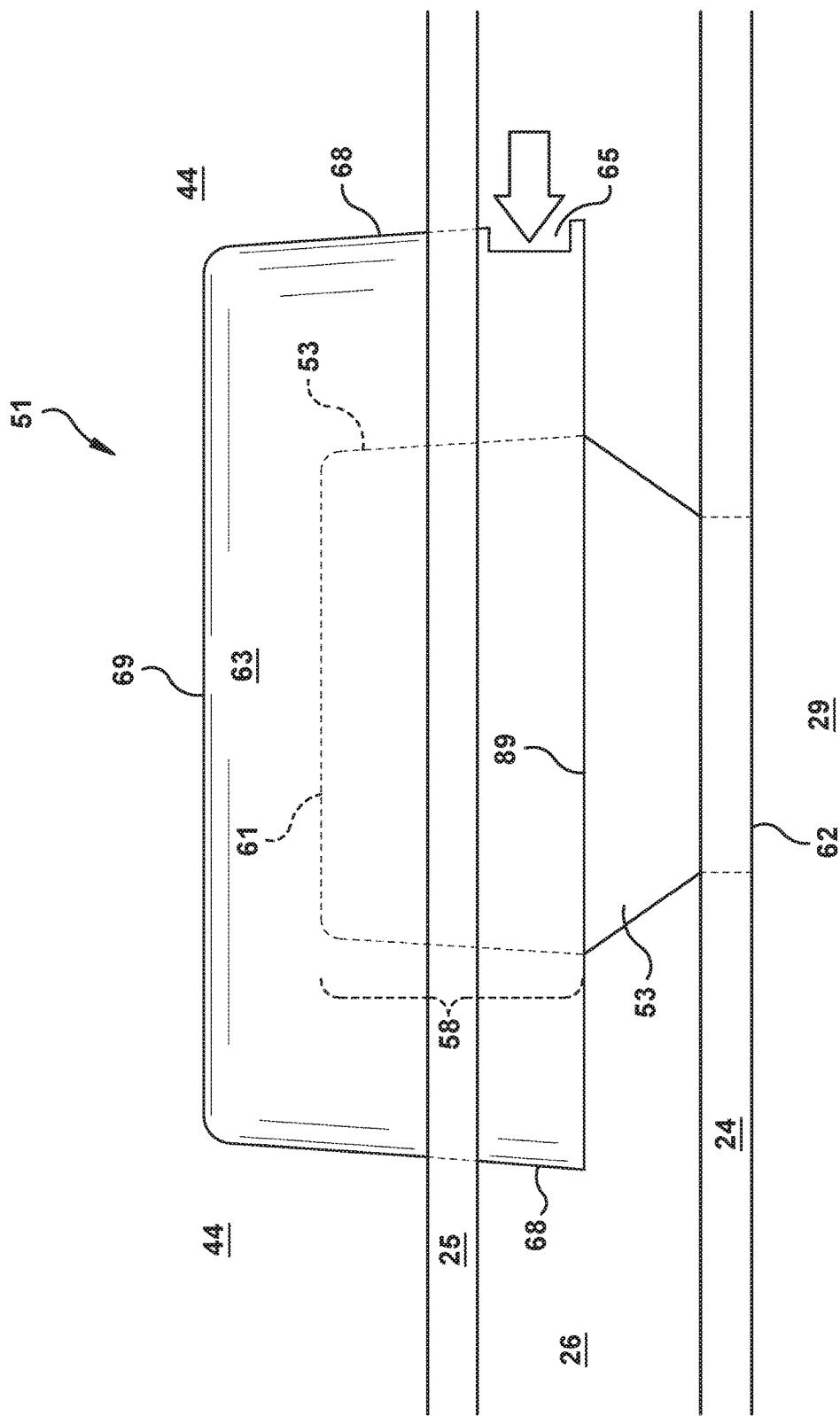
FIG. 9 is a sectional side view of an alternative installed configuration of a staged injector relative to inner and outer radial walls of the combustor in accordance with the present invention.

With particular reference now to FIGS. 8 and 9, the staged injector 51 may be configured to receive via the directional cover port 65 a supply of air either directly from the compressor discharge cavity 44 or, alternatively, indirectly from the compressor discharge cavity 44 via the flow annulus 26. The combustor 13, as already described, may include an inner radial wall 24, an outer radial wall 25, and a flow annulus 26 formed therebetween, and the compressor discharge cavity 44 may be formed about the outer radial wall 25. The inboard boundary of the surrounding plenum 66 may be designated as a floor wall 89. Thus, the inboard side of the surrounding plenum 66 may be further bound by a floor wall 89, which spans between an inboard boundary or edge of the side wall 68. The floor wall 89 thus opposes the ceiling wall 69 across the surrounding plenum 66. The inboard boundary of the outboard segment 58 of the injector tube 53 may be defined relative to the floor wall 89. Specifically, the inboard boundary of the outboard segment 58 may described as being coplanar with the floor wall 89. According to one possible arrangement, as illustrated in FIG. 8, the floor wall 89 reside approximately coplanar with the outer radial wall 25 of the combustor. In this case, the feed cavity for the directional cover port 65 becomes the compressor discharge cavity 44 formed about the outer radial wall 25 of the combustor 13. Thus, as shown, the directional cover port 65, which is formed through the side wall 68 of the cover 63, accepts a flow of air directly from the compressor discharge cavity 44. Alternatively, as shown in FIG. 9, the floor wall 89 may be formed inboard of the outer radial wall 25 of the combustor 13. In this case, as illustrated, the directional cover port 65 may connect directly to the flow annulus 26. In either case, the ceiling wall 69 of the cover 63 may be configured as a continuous wall that fluidly isolates the second portion 73 of the surrounding plenum 66 from the feed cavity, which means that the total supply of air for the staged injector 51 comes through the opening formed side wall 68 (i.e., the directional cover port 65).

The directional cover port 65 may include one or more openings that are positioned and/or concentrated on just one side of the side wall 68 of the cover 63. As will be appreciated, with the directional cover port 65 positioned in this manner, the resulting flow of air through the surrounding plenum 66 will have a strong directional bias. Without the lateral vanes 70, the amount of flow around the circumference of the injector tube 53 would vary due to the directional difference between the initial direction at entry and the direction required for flow into the inlet 61 of the injector tube 53. As provided herein, the lateral vanes 70 may be positioned and oriented so to redirect the air from a predominantly axial flow upon entry to a radial one oriented toward the inlet 61. Thus, in operation, portions of the airflow entering the surrounding plenum 66 via the directional cover port 65 may be redirected toward the inlet 61 of the injector tube 53 by the lateral vanes 70. This may be done in a way such that direction of the entire flow is gradually turned toward the inlet 61 in a more aerodynamically efficient manner. As discussed more below, the lateral vanes 70 may be staggered in ways that condition and balance the flow about the inlet 61 of the injector tube 53, which may further improve the aerodynamic performance of the staged injector 51. This stagger may include varying the size of the lateral vanes 70, including height, width, and surface area, the positioning of the lateral vanes 70, as well as, the degree to which the lateral vanes 70 are canted or angled relative the axis of the injector tube 53.

Figure 10:
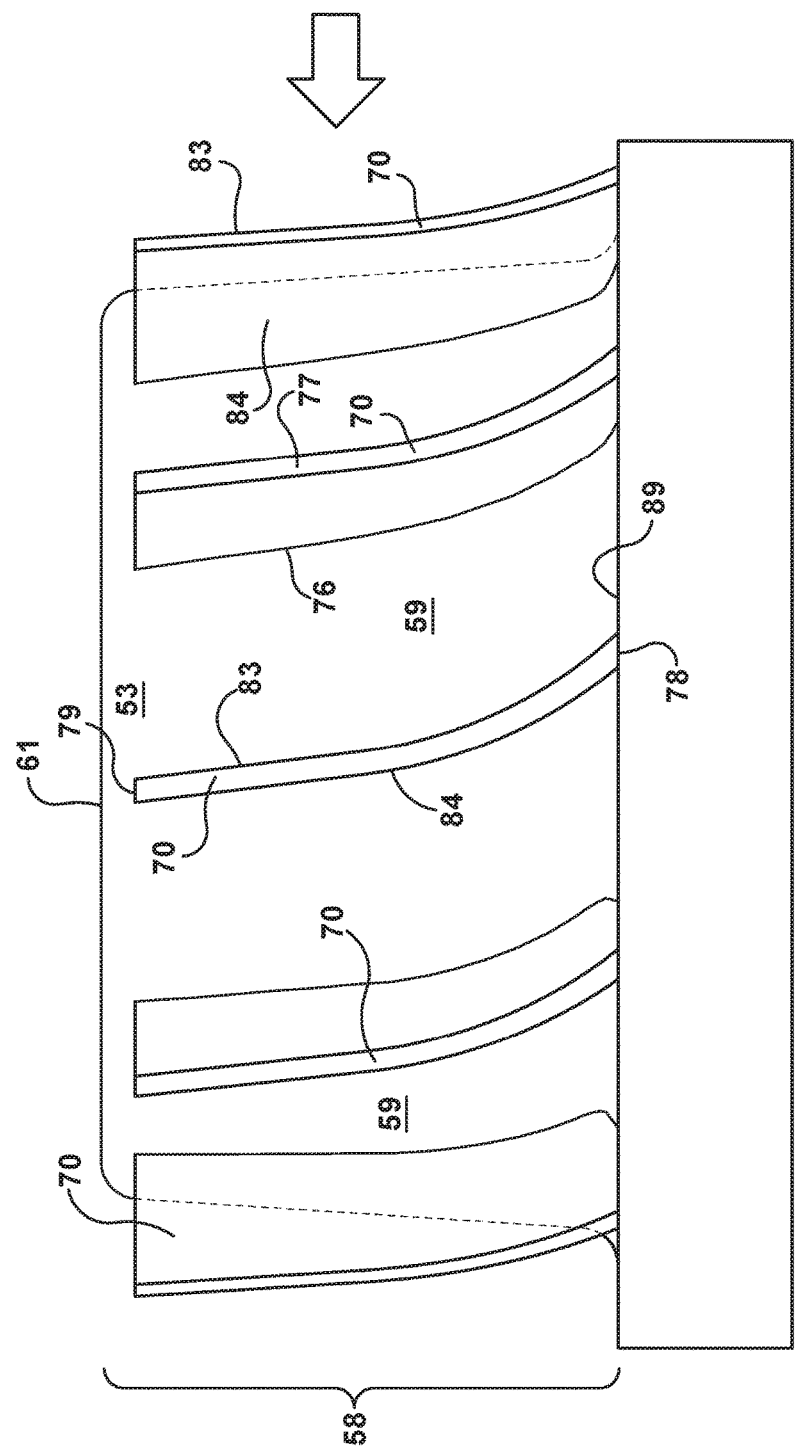
FIG. 10 is a side view schematic representation of an outboard segment of an injector tube having lateral vanes in accordance with an embodiment of the present invention.
Figure 11:
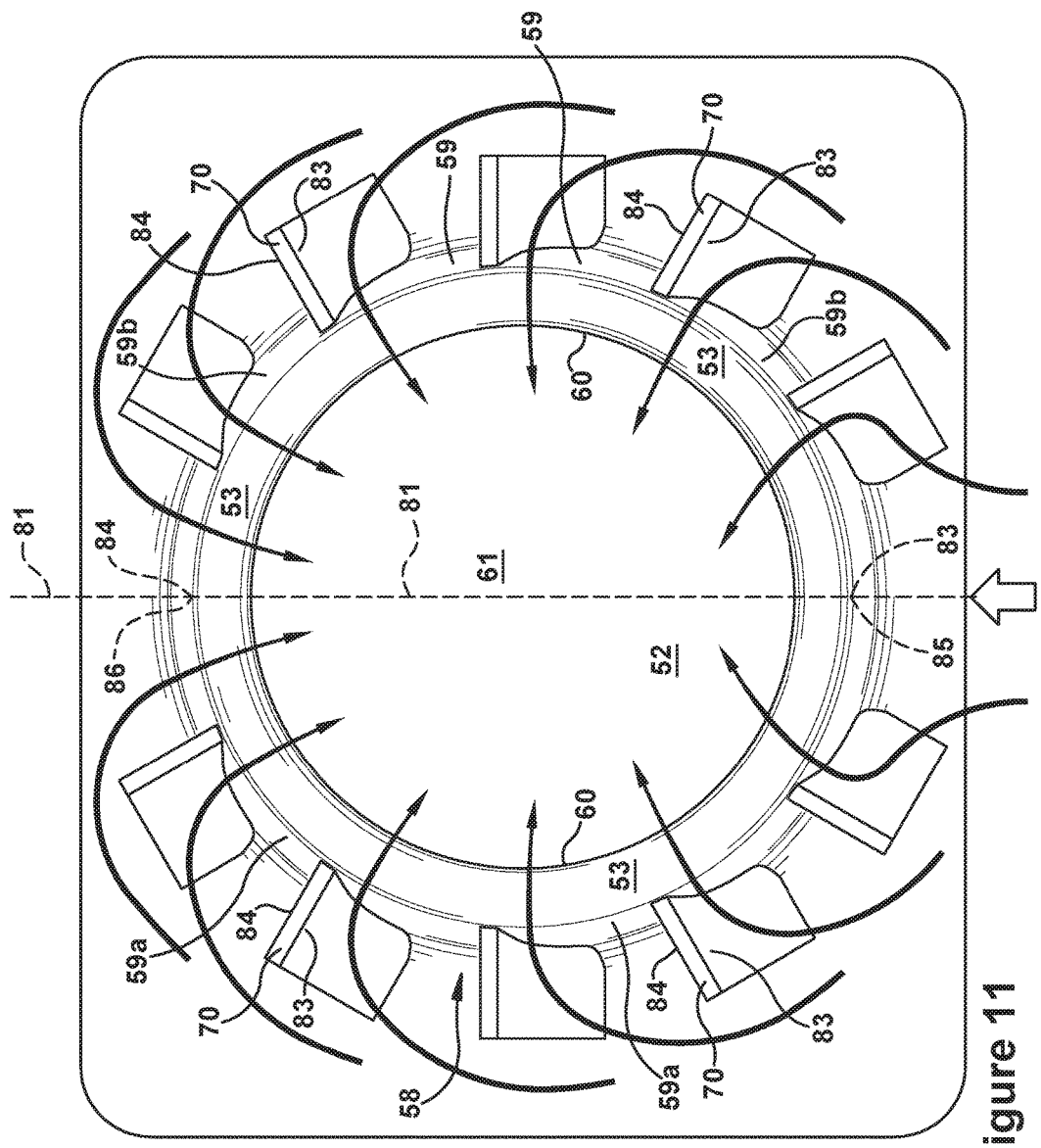
FIG. 11 is a top view of the injector tube of FIG. 10.

Referring now to FIGS. 10 and 11, an initial non-staggered embodiment is provided that demonstrates an exemplary circumferential placement of lateral fins 70 about the exterior face 59 of the injector tube 53. FIG. 10 provides a side view the outboard segment 58 of an injector tube 53, which shows the positioning of the lateral vanes 70 on one of the exterior faces 59a, 59b that may be created to each side of a reference bisecting plane 81, while FIG. 11 provides an outboard view of the same configuration. As illustrated, the lateral fins 70 may be evenly spaced about the circumference of the exterior face 59. As shown most clearly in FIG. 11, the reference bisecting plane 81 may be aligned pursuant to the predominant flow direction through the surrounding plenum 66, the direction of which is indicated by the arrow. The predominant direction of flow, as discussed, may stem from the asymmetrical placement of the one or more directional cover ports 65, which may include a placement limited to only one side of the cover 63. The flow direction may further develop according to a pressure differential across the side wall 68 of the cover 63, which, for example, may be present in cases where feed cavity is a flow annulus 26 in which the total supply of air moving therethrough is directed toward the head end 19 of the combustor 13.

According to the example of FIGS. 10 and 11, the lateral vanes 70 may be radially oriented and have a linear configuration. The lateral vanes 70, thus, may define a substantially linear path that extends radially between the inboard edge 78 and the outboard edge 79 of the lateral vane 70. Alternatively, as shown more clearly in relation to FIG. 12, the lateral vanes 70 may define a curved, or partly curved, path. This may include each of the lateral vanes 70 having a concave section on the upstream face 87. According to preferred embodiments, this concave section may be positioned near the inboard edge 78 of the lateral vane 70, which is to say, it borders the inboard edge 78 of the lateral vane 70. As further shown, according to the non-staggered arrangement of FIGS. 10 and 11, the height and width of the lateral vanes 70 may remain substantially constant across each of the exterior faces 59a, 59b. According to exemplary staggered embodiments, as discussed below in relation to FIGS. 12 through 15, the height and width of the lateral vanes 70 may be varied according to circumferential position so to promote improved aerodynamic performance.

Figure 12:
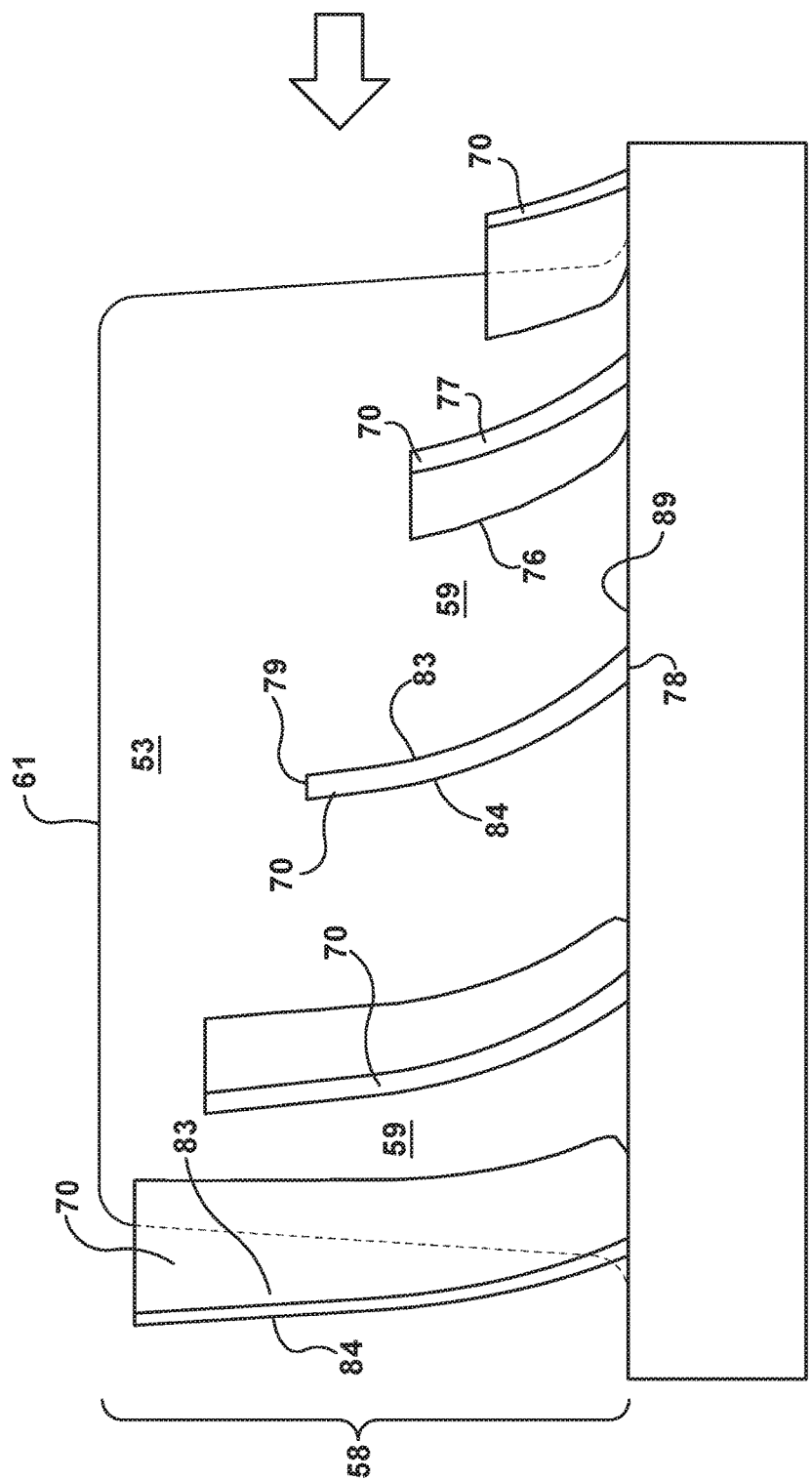
FIG. 12 is a side schematic representation of an outboard segment of an injector tube having staggered lateral vanes in accordance with embodiments of the present invention.
Figure 13:
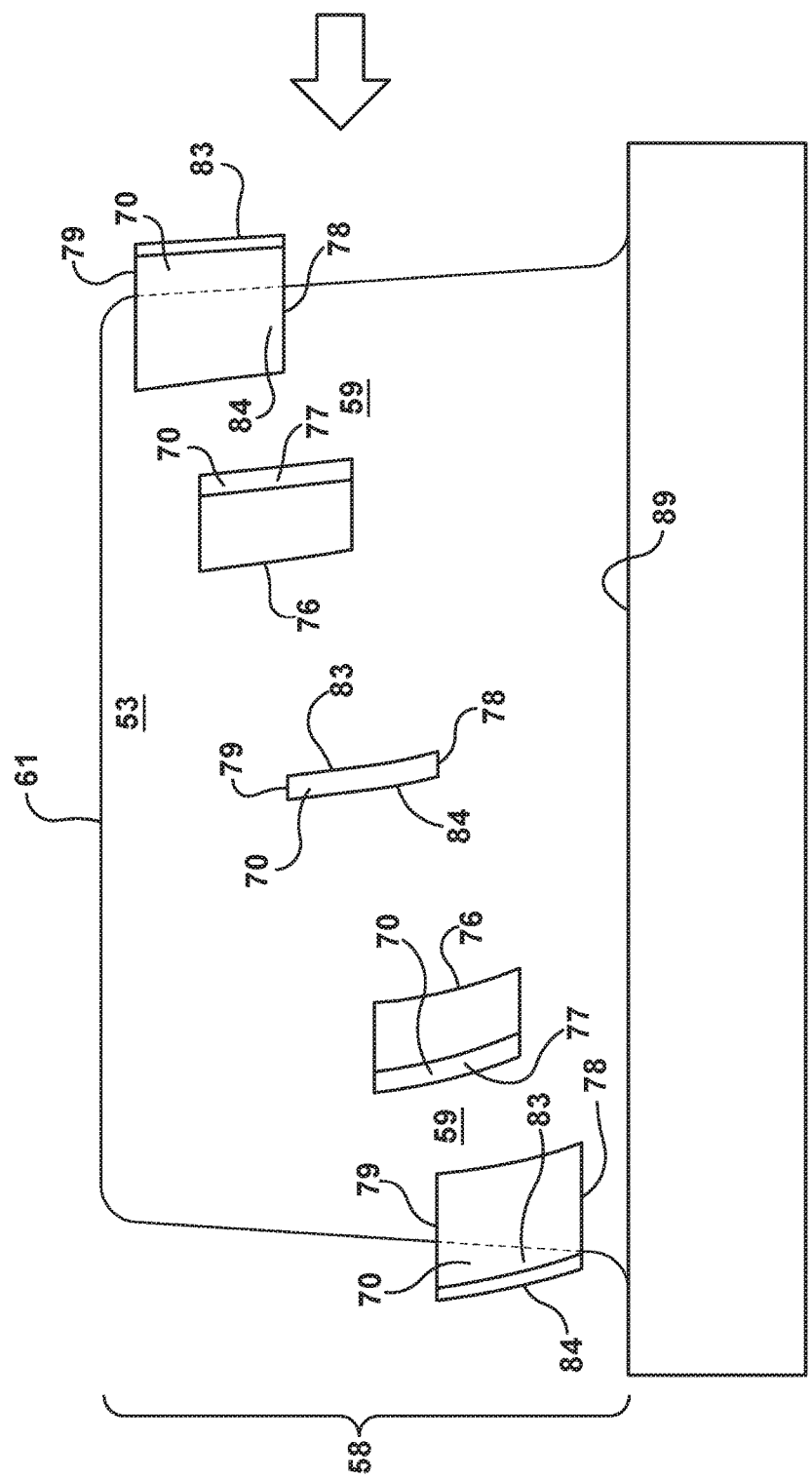
FIG. 13 is a side schematic representation of an outboard segment of an injector tube having staggered lateral vanes in accordance with an alternative embodiment of the present invention.
Figure 14:
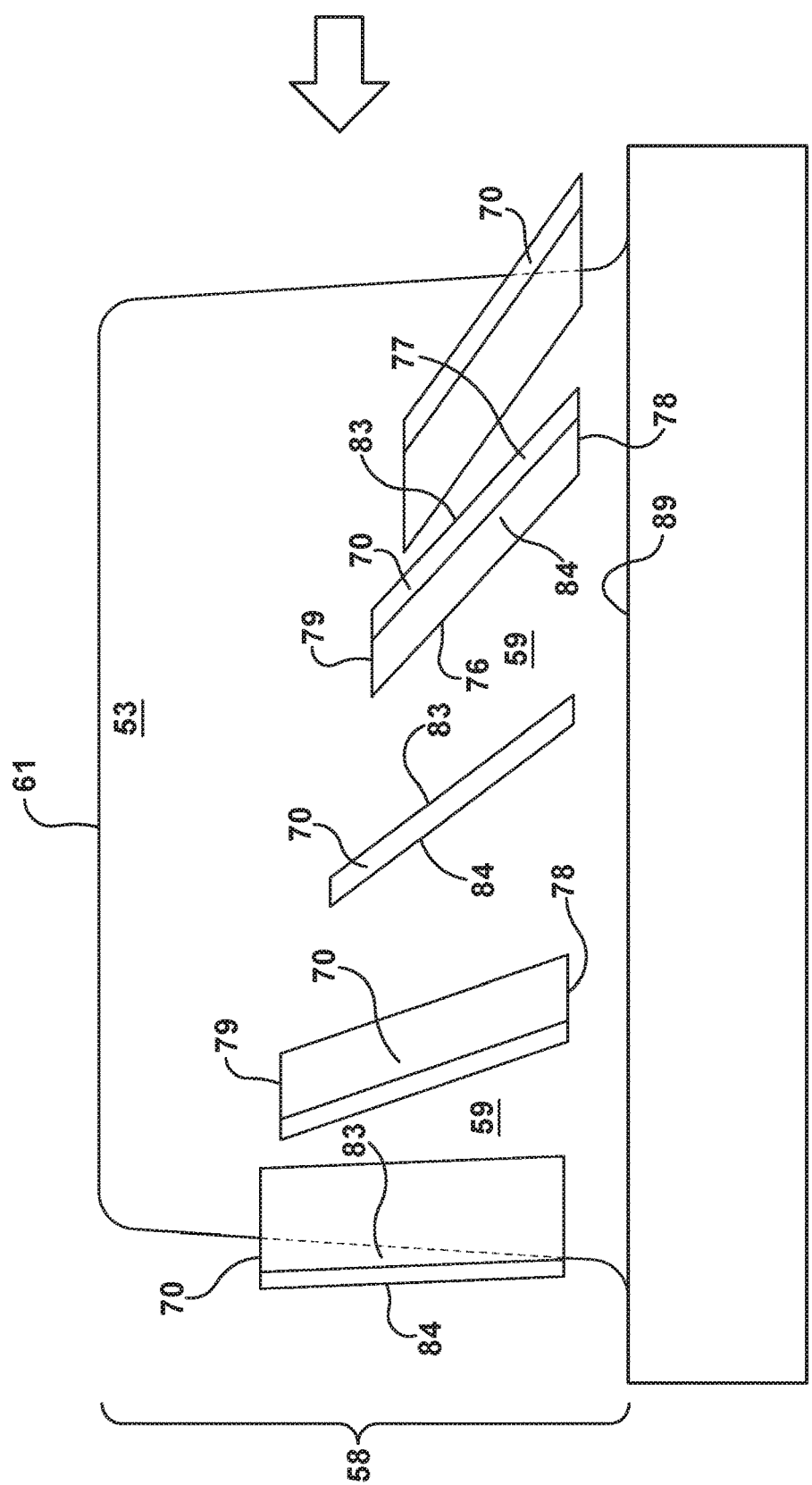
FIG. 14 is a side schematic representation of an outboard segment of an injector tube having staggered lateral vanes in accordance with an alternative embodiment of the present invention.
Figure 15:
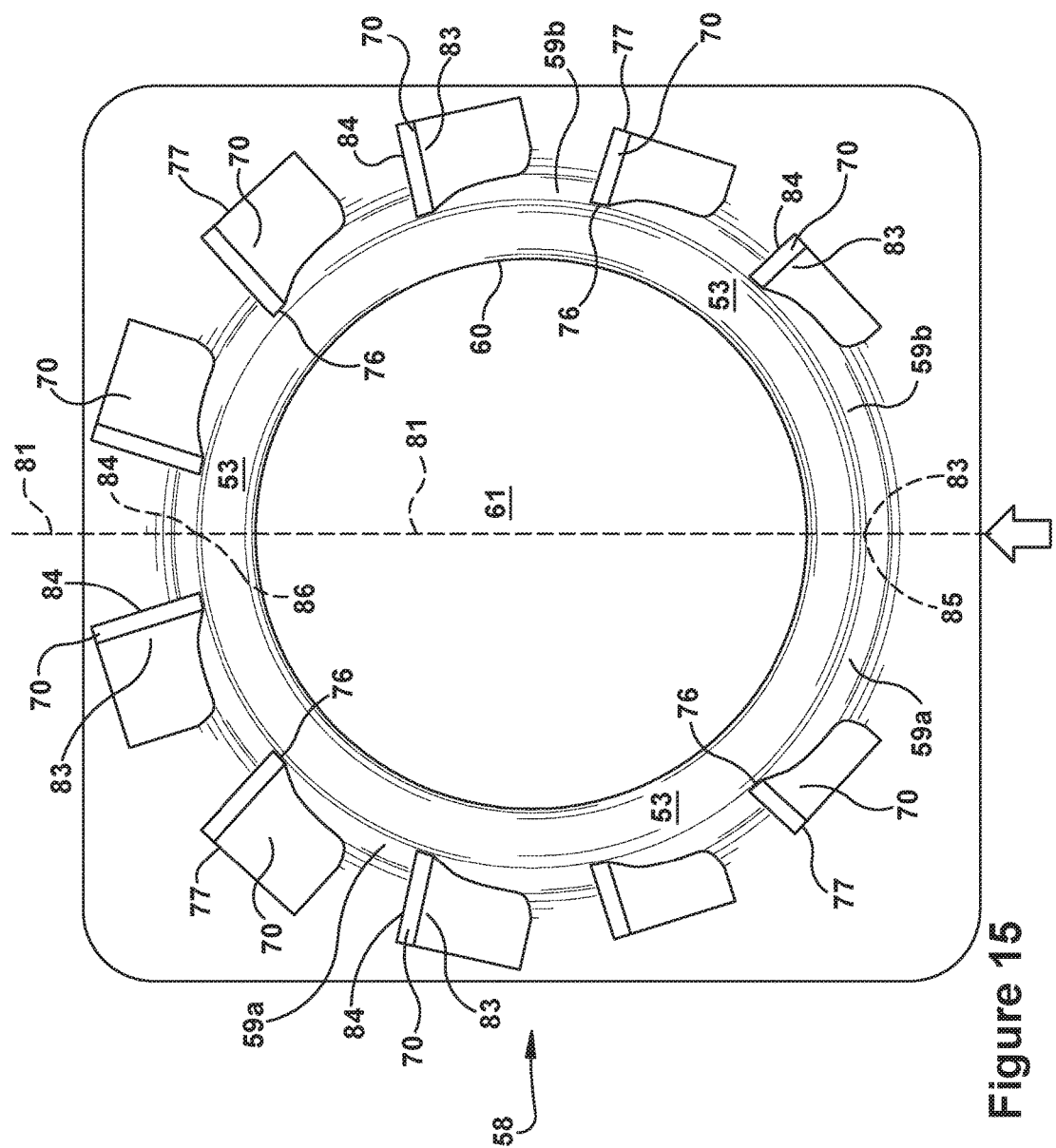
FIG. 15 is a top view of a schematic representation of an outboard segment of an injector tube having staggered lateral vanes in accordance with an alternative embodiment of the present invention.

Referring now to FIGS. 12 through 15, the lateral vanes 70 may be formed and positioned on the exterior face 59 according to a staggered configuration. As will be appreciated, FIGS. 12 through 14 illustrate half of the exterior face 59a, 59b of the outboard segment 58 of the injector tube 53 defined to each side of the reference bisecting plane 81, while FIG. 15 provides an outboard view of the outboard segment 58. According to present invention, the staggered configuration may include a directional asymmetry or dimensional variance within the lateral vanes that is intended to account for the directionally of the airflow within the surrounding plenum 66. As will be demonstrated, the staggered configuration of the present invention may be one that beneficially conditions the flow entering the first portion 72 of the surrounding plenum 66, radially deflects that flow in stages along a more radially oriented track toward the inlet 61, and is progressive so that portions of the total flow are delivered more evenly to the different sides of the inlet 61 of the injector tube 53. As will be appreciated, the staggered configuration may thus condition and meter the flow so that aerodynamically performance about the injector tube 53 is enhanced, which may improve fuel mixing characteristics within the injector tube 53.

FIG. 12 is a side view schematic representation of an outboard segment 58 of an injector tube 53 in which the lateral vanes 70 are staggered in accordance with an exemplary embodiment of the present invention. In this case, the staggered configuration includes varying the height of the lateral vane 70 as well as surface area of the upstream face 87 relative to the circumferential position of the lateral vane 70. According to a preferred embodiment, the varying of the height includes a progressive increase as the circumferential position of each of the lateral vanes 70 nears the downstream edge 86 of the exterior face 59. As will be appreciated, this results in the surface area progressively increasing in the same way.

FIG. 13 is side view schematic representation of an outboard segment 58 of an injector tube 51 having staggered lateral vanes 70 in accordance with an alternative embodiment of the present invention. In this example, the height of the lateral vanes 70 remains constant. The height of the lateral vanes 70 also is much less than the overall height of the exterior face 59 of the outboard segment 58, which may allow for the radial positioning between the lateral vanes 70 to vary significantly. Thus, the lateral vanes 70 may be staggered according to a relative radial placement of the lateral vanes 70 on the exterior face 59. Specifically, according to the alternative of FIG. 13, the staggered configuration includes varying the radial position of the lateral vane 70 relative to the circumferential position of the lateral vanes 70. According to a preferred embodiment, the radial position of the inboard edge 78 of the lateral vane 70 may be positioned nearer to the floor wall 89 as the circumferential position of the vane 70 nears the downstream edge 86.

FIG. 14 is a side view schematic representation of an outboard segment 58 of an injector tube 53 having staggered lateral vanes 70 in accordance with an alternative embodiment of the present invention. As already shown to a lesser degree in the figures above, the lateral vanes 70 may be canted relative to the injector tube 53. Specifically, the lateral vanes 70 may be angled relative to the longitudinal axis of the injector tube 53. This cant or angle may be a downstream canted configuration in which the lateral vanes 70 slant in a downstream direction (i.e., the downstream edge 86 of the exterior face 59) as the lateral vane 70 extends from the inboard edge 78 to the outboard edge 79. According to certain embodiments, each of the lateral vanes 70 may include this downstream canted configuration. Each of the lateral vanes 70 may be canted according to the same angle, or, according to the exemplary configuration shown in FIG. 14, the lateral vanes 70 may lean downstream per varying angles. In this manner, as shown, an alternative staggered configuration may be formed by varying the angle of the downstream canted configuration relative to the circumferential position of the lateral vanes 70. As illustrated, this may include the lateral vanes 70 becoming less canted (i.e., more radially oriented) as the circumferential position of the vane 70 nears the downstream edge 86.

FIG. 15 is a top view of a schematic representation of an outboard segment 58 of an injector tube 51 having staggered lateral vanes 70 pursuant to another alternative. As shown, the staggered configuration in this case includes varying the width of the lateral vanes 70 relative to a circumferential position of each. As stated earlier, the width of the lateral vane 70 is the distance between the near edge 76 and the far edge 77. According to preferred embodiments, the width may be varied progressively per the circumferential position of each of the lateral vanes 70. Specifically, the width of the lateral vanes 70 may increase as the position of the lateral vane 70 nears the downstream edge 86 of the exterior face 59.

Figure 16:
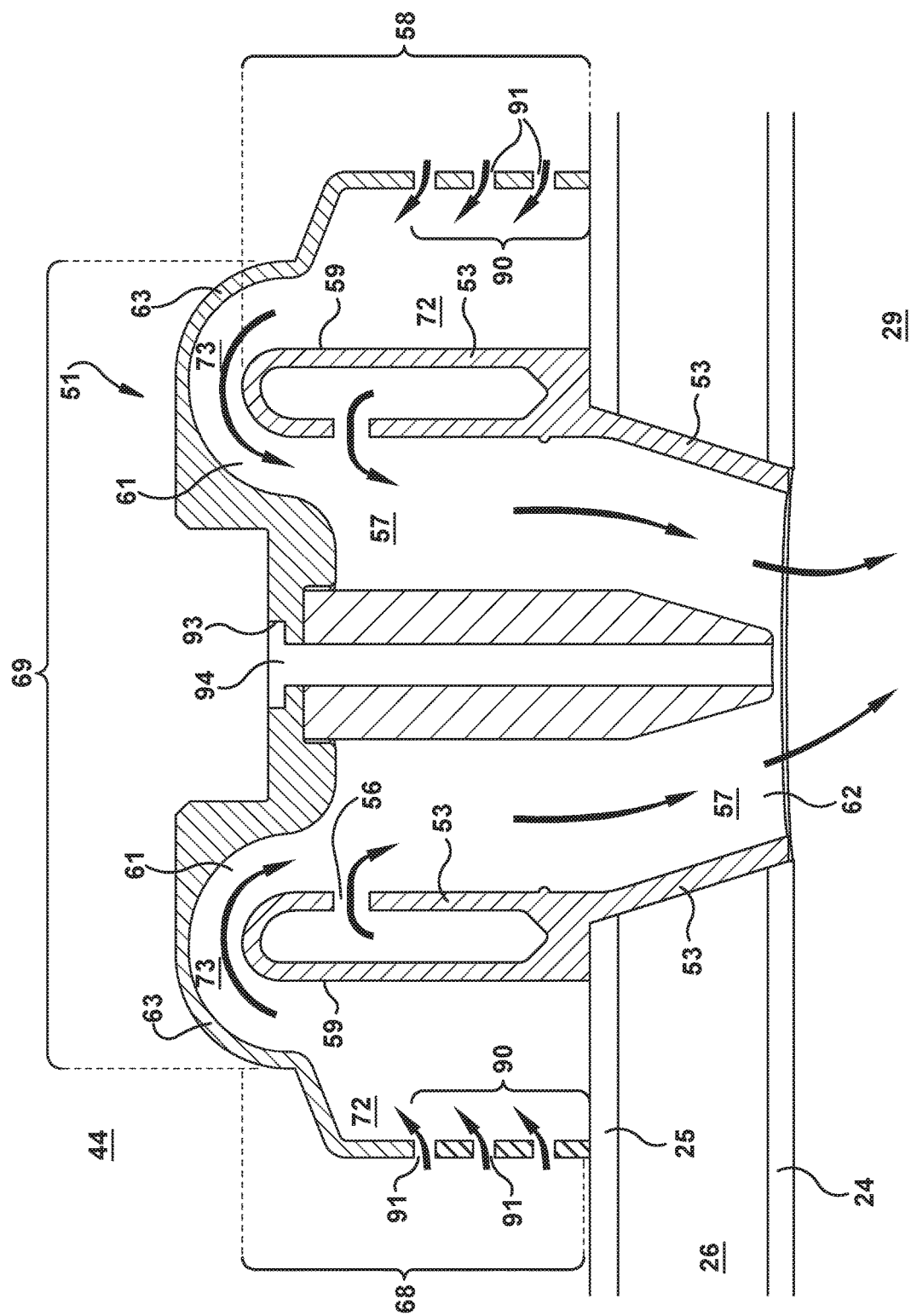
FIG. 16 is a sectional side view of a staged injector having a cover according to an alternative embodiment of the present invention.
Figure 17:
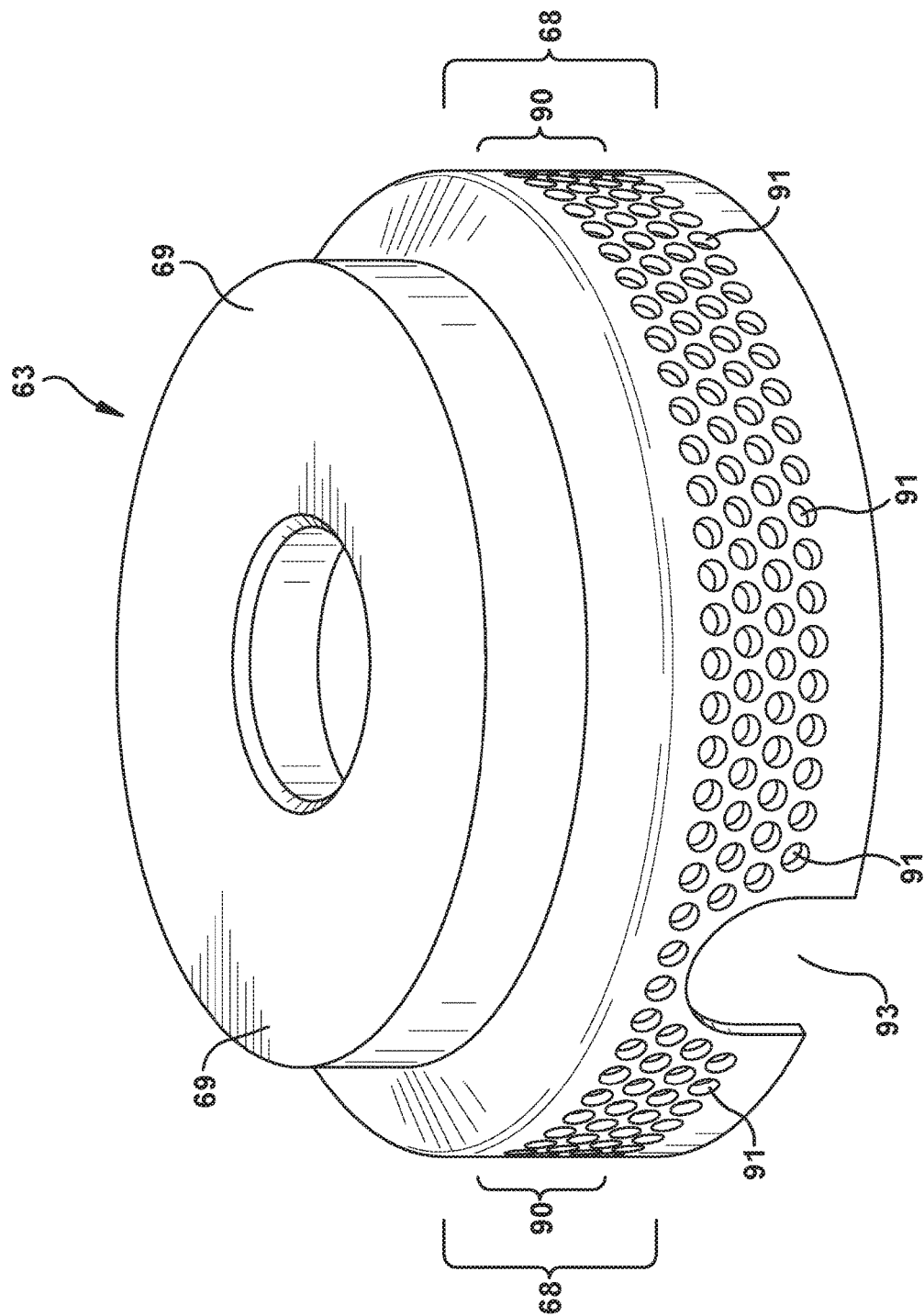
FIG. 17 is a perspective view of the cover of the staged injector of FIG. 16.

Referring now to FIGS. 16 through 18, an alternative embodiment of the staged injector 51 is illustrated in which the cover 63 includes a screening section or plate ("screening plate 90") that includes a multitude of small screening or conditioning apertures ("aperture 91"), which are configured to condition the airflow entering the surrounding plenum 66 from the feed cavity. It is intended that aspects of the present invention that are described in relation to FIGS. 16 through 18 may be used independently or in conjunction with those aspects that are provided above in relation to FIGS. 6 through 15. As provided herein, the presently described screening plate 90 may be configured to allow a desired level of inlet flow into the staged injector 51, condition that flow for performance benefits, as well as define and control variability of the airflow being supplied to the inlet 61 of the injector tube 53 for advantageously mixing with a fuel supply. Additional benefits include improved emissions and more robust flame holding margins. The present embodiment also may enable cost reductions given its manufacturability and efficiency for assembly. For example, the present design may allow for convenient replacement of damaged parts as well as making it cost effective to replace the component to achieve new airflow objectives within the staged injector 51. As will be discussed, the present design of the cover 63 also defines and controls flowpath variability by locating and bolting directly to the staged injector 51 about a component centerline. As will be appreciated, the level of airflow as well as flowpath variability may be tightly controlled.

FIG. 16 is a sectional view of a staged injector 51 including a cover 63 having a screening plate 90 according to exemplary embodiments, while FIGS. 17 and 18 provide, respectively, perspective and side views of the cover 63 itself. As illustrated, according to the exemplary configuration, the screening plate 90 is formed as a section of the side wall 68 of the cover 63. As such, the screening plate 90 may have a cylindrical configuration that surrounds or encircles the injector tube 53. The screening plate 90 may be concentrically arranged relative to the injector tube 53, i.e., the screening plate 90 may be offset from the injector tube 53 by a constant distance. As will be appreciated, the distance by which the screening plate 90 is offset from the injector tube 53 defines the size of the first portion 72 of the surrounding plenum 66.

Though other configurations are also possible, the apertures 91 of the screening plate 90 may be organized into several rows and/or columns that extend about the circumference of the staged injector 51. That is to say, according to a preferred embodiment, the screening plate 90 and the apertures 91 associated therewith may extend around the entirety of the circumference of the side wall 68. According to other embodiments, the screening plate 90 and the apertures 91 associated therewith may extend around at least a majority of the circumference of the side wall 68. For instance, an exemplary embodiment of the screening plate 90 extends the apertures 91 around approximately three-quarters (0.75) of the circumference of the side wall 68. Such embodiments may still achieve the many of the already discussed performance benefits.

The present embodiment includes a screening plate 90 that has a high number of apertures 91. As will be appreciated, possible embodiments may include more or less apertures 91 than the exemplary amount shown. According to certain preferred embodiments, the number of apertures 91 may be between 50 and 300. As further shown, the apertures 91 may be tightly packed. According to preferred embodiments, multiple linear rows may be provided that extend circumferentially about the cover 63. These linear rows of apertures 91 may be stacked radially. As shown, five such rows may be provided, though other configurations having more or less rows are possible. As illustrated, in the case where the apertures 91 have a circular cross-sectional shape, the placement of the apertures 91 may be densely placed with partial overlap between neighboring rows according to a hexagonal packing scheme. In such cases, the remaining structure within the screening plate 90 that defines the openings may take on a web-like or lattice appearance. Other configurations are also possible.

Preferably, the apertures 91 are circular or oval in cross-sectional shape, though other shapes are also possible. The apertures 91 may be configured to extend through the thickness of the screening plate 90 along a path that is approximately perpendicular to the outer surface of the cover 63. In this way, the apertures 91 may be made along an axis such that each is approximately oriented toward or aimed at the injector tube 53, or, more preferably, the center axis of the injector tube 53. According to exemplary embodiments, the axis of orientation along which each of the apertures 91 extends through the screening plate 90 may be aimed at or toward an area of the exterior face 59 of the injector tube 53 that directly opposes the particular aperture 91 across the first portion 72 of the surrounding plenum 66. As further shown in FIGS. 17 and 18, the side wall 68 may include a fuel passageway opening 93 which partially interrupts the screening plate 90. Other configurations for connecting the fuel passageway 52 to the staged injector 51 are also possible.

The apertures 91 may vary in cross-sectional flow area so to permit a desirable level of airflow ingestion by the staged injector 51, while also being shaped and oriented to promote a particular directionality and velocity to the entering flow. In this manner, the screening plate 90 may be configured to desirably control directionality, velocity, and flow levels around the injector tube 53. As will be appreciated, the screening plate 90 may condition the airflow according to a wide range of flow levels, velocities, and directions. Specifically, the cylindrical shape of the screening plate 90 permits the initial direction of the airflow in the surrounding plenum 66 to be less severe relative to its ultimate direction of flow within the injector tube 53. The cross-sectional flow area of the apertures 91 may be constant around the circumference of the screening plate 90. According to an alternative embodiment, the cross-sectional flow area of the apertures 91 may be varied in size pursuant to predetermined or desired flow characteristics within the surrounding plenum 66. For example, according to one preferred embodiment, the cross-sectional flow area of the apertures 91 in one region of the screening plate 90 vary with regard to the cross-sectional flow are of apertures in a separate region of the screening plate 90. As will be appreciated, this may be done, for example, to achieve even flow rates around the injector tube 53. For example, when a pressure differential is expected over the exterior of the cover 63 during operation, the cross-sectional area of the apertures 91 may be reduced where the higher pressure levels are expected and/or increased where the lower pressure levels are expected. In this manner, flow levels into the staged injector 51 may be balanced so that aerodynamic losses are minimized. This type of embodiment may be used within a feed cavity, such as the flow annulus 26, where the airflow is highly directional.

According to a preferred embodiment, the cover 63 also may include an opening 93 formed through the center of the ceiling wall 69 for securing it to the injector tube 53. In this case, for example, a threaded bolt 94 may be used to efficiently secure the cover 63 about the injector tube 53, while also ensuring that the two components are aligned as intended.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A staged injector in a combustor of a gas turbine, wherein the combustor includes an inner radial wall defining a combustion zone downstream of a forward nozzle, the staged injector comprising:

an injector tube comprising a lateral wall enclosing an injection passageway that extends between an outlet and an inlet, wherein:

the outlet fluidly connects the injection passageway to the combustion zone;

the inlet is positioned outboard of the outlet such that the injection passageway comprises an injection angle;

a cover formed about an outboard segment of the injector tube so to enclose the outboard segment within a surrounding plenum, wherein the cover further includes:

a side wall that radially overlaps and encircles the outboard segment of the injector tube thereby forming a first portion of the surrounding plenum therebetween; and a ceiling wall spanning between an outboard edge of the side wall so to form a second portion of the surrounding plenum that is outboard of the inlet of the injector tube; and a screening plate formed within the side wall of the cover that includes a multitude of apertures configured to fluidly connect the first portion of the surrounding plenum with a feed cavity formed exterior to the side wall, the screening plate comprising a radially defined section of the side wall of the cover that extends circumferentially around at least a majority of a circumference of the sidewall:

wherein:

the lateral wall of the outboard segment comprises an interior face, which defines a portion of the injection passageway, and an exterior face, which defines a circumference of the outboard segment;

between the interior face and the exterior face, the outboard segment of the injector tube comprises a fuel plenum that encircles the injection passageway: and the interior face of the injector tube comprises fuel ports fluidly connected to the fuel plenum.

2. The staged injector according to claim 1, wherein the staged injector comprises a fuel and air injector axially staged downstream of the forward nozzle, the staged injector being describable according to orientation characteristics of the combustor, which include:

relative radial, axial, and circumferential positioning defined pursuant to a central axis of the combustor that extends longitudinally through the combustion zone defined within the inner radial wall;

a forward direction and an aftward direction defined relative to a forward end of the combustor defined by a head end and an aftward end of the combustor defined by a connection made with a turbine; and a flow direction defined relative to an expected direction of flow within a specified conduit during operation of the gas turbine.

3. The staged injector according to claim 2, wherein the outboard segment comprises a longitudinally defined segment of the injector tube that to one side borders the inlet of the injector tube;

wherein the ceiling wall of the cover comprise a continuous wall that fluidly isolates the second portion of the surrounding plenum from a region exterior to the surrounding plenum; and wherein, along an inboard side, the surrounding plenum is bound by a floor wall, the floor wall opposing the ceiling wall across the surrounding plenum.

4. The staged injector according to claim 3, wherein the radially defined section of the side wall extends circumferentially around at least three-quarters (0.75) of the circumference of the side wall.

5. The staged injector according to claim 3, wherein the radially defined section of the side wall extends circumferentially around an entirety of the circumference of the side wall.

6. The staged injector according to claim 3, wherein the combustor comprises an outer radial wall, the outer radial wall being formed about the inner radial wall such that a flow annulus is formed therebetween;

wherein a compressor discharge cavity is formed about the outer radial wall; and wherein the screening plate comprises between 50 and 300 apertures.

7. The staged injector according to claim 6, wherein an inboard boundary of the side wall is defined coplanar to the floor wall and an outboard boundary of the side wall is defined coplanar to the inlet of the injector tube;

wherein the radially defined section of the sidewall comprises a substantially constant radial offset from both the inboard boundary and the outboard boundary of the side wall;

wherein the injector tube comprises a cylindrical configuration;

wherein the screening plate comprises a cylindrical configuration that is concentrically arranged about the injector tube; and wherein each of the multitude of apertures are configured to extend through a thickness of the screening plate along a path that is approximately perpendicular to an outer surface of the screening plate that surrounds each of the multitude of apertures.

8. The staged injector according to claim 6, wherein the multitude of apertures are arranged in multiple circumferential extending, radially stacked rows that extend about the circumference of the side wall;

wherein the multitude of apertures comprise a circular cross-sectional shape; and wherein the multitude of apertures are arranged in a tightly packed configured according to a hexagonal packing scheme in which the apertures in neighboring rows at least partially overlap.

9. The staged injector according to claim 6, wherein an axis along which each of the multitude of apertures extends through the screening plate comprises an orientation such that each of the multitude of apertures is trained upon an area of the exterior face of the outboard segment that directly opposes another aperture of the multitude of apertures across the first portion of the surrounding plenum.

10. The staged injector according to claim 6, wherein each aperture of the multitude of apertures of the screening plate comprises a substantially same cross-sectional flow area.

11. The staged injector according to claim 6, wherein the multitude of apertures of the screening plate are configured having cross-sectional flow areas that vary between at least a first region and second region of the screening plate, and wherein a variation in cross-sectional flow areas is based on a desired flow characteristic within the surrounding plenum.

12. The staged injector according to claim 11, wherein the desired flow characteristic is one that relates to an equal rate of airflow ingestion between the first region and the second region.

13. The staged injector according to claim 12, wherein the cross-sectional flow areas between the first area and the second area are varied according to an expected pressure differential between the first region and the second region;

wherein the expected pressure differential comprises the first region having a higher pressure than the second region; and wherein the variation of the cross-sectional flow areas comprises the first region having smaller cross-sectional flow areas than that of the second region.

14. The staged injector according to claim 6, wherein the cover comprises an opening formed through a center of the ceiling wall configured for engagement by a bolt that extends therethrough for attaching the cover to the staged injector.

15. The staged injector according to claim 6, wherein the floor wall resides approximately coplanar with the outer radial wall of the combustor; and wherein the feed cavity comprises the compressor discharge cavity formed about the outer radial wall of the combustor.

16. The staged injector according to claim 6, wherein the floor wall and the screening plate reside inboard of the outer radial wall of the combustor; and wherein the feed cavity comprises the flow annulus formed between the inner radial wall and outer radial wall of the combustor.

17. The staged injector according to claim 16, wherein the staged injector and the forward injector comprise a late lean injection system;

wherein the flow annulus is configured to carry a supply of compressed air toward a cap assembly positioned at a forward end of the combustor within which the forward nozzle is housed; and wherein the injection angle comprises an angle formed between a longitudinal axis of the injector tube and a longitudinal axis of the combustion zone, and wherein the injection angle comprises between 70° and 110°.

18. A combustor in a gas turbine that includes an inner radial wall defining a combustion zone and an outer radial wall formed about the inner radial wall such that a flow annulus is formed therebetween, wherein the combustor further comprises a staged injection system that includes a forward nozzle and, axially staged downstream from the forward nozzle, a staged injector, wherein the staged injector comprises:

an injector tube comprising a lateral wall enclosing an injection passageway that extends between an outlet and an inlet, wherein:

the outlet fluidly connects the injection passageway to the combustion zone;

the inlet is positioned outboard of the outlet such that the injection passageway comprises an injection angle relative to a longitudinal axis of the combustion zone;

a cover formed about an outboard segment of the injector tube so to enclose the outboard segment within a surrounding plenum, wherein the cover further includes:

a side wall that radially overlaps and encircles the outboard segment of the injector tube thereby forming a first portion of the surrounding plenum therebetween; and a ceiling wall spanning between an outboard edge of the side wall so to form a second portion of the surrounding plenum that is outboard of the inlet of the injector tube;

a screening plate formed within the side wall of the cover that includes between 50 and 300 discrete apertures configured to fluidly connect the first portion of the surrounding plenum with a feed cavity formed exterior to the side wall;

wherein the screening plate further comprises a radially defined section of the side wall of the cover, the radially defined section of the side wall extending circumferentially around an entirety of the circumference of the side wall; and wherein:

the lateral wall of the outboard segment comprises an interior face, which defines a portion of the injection passageway, and an exterior face, which defines a circumference of the outboard segment;

between the interior face and the exterior face, the outboard segment of the injector tube comprises a fuel plenum that encircles the injection passageway; and the interior face of the injector tube comprises fuel ports fluidly connected to the fuel plenum.

\* \* \* \* \*